US010055462B2

(12) United States Patent
Moxley et al.

(10) Patent No.: US 10,055,462 B2
(45) Date of Patent: Aug. 21, 2018

(54) PROVIDING SEARCH RESULTS USING AUGMENTED SEARCH QUERIES

(71) Applicant: Google Inc., Mountain View, CA (US)

(72) Inventors: Emily Moxley, San Francisco, CA (US); Sean Liu, El Dorado Hills, CA (US)

(73) Assignee: Google LLC, Mountain View, CA (US)

( * ) Notice: Subject to any disclaimer, the term of this patent is extended or adjusted under 35 U.S.C. 154(b) by 490 days.

(21) Appl. No.: 13/842,572

(22) Filed: Mar. 15, 2013

(65) Prior Publication Data

US 2014/0280089 A1 Sep. 18, 2014

(51) Int. Cl.
*G06F 17/30* (2006.01)
(52) U.S. Cl.
CPC .... *G06F 17/3053* (2013.01); *G06F 17/30646* (2013.01); *G06F 17/30864* (2013.01)
(58) Field of Classification Search
USPC ............... 707/607, 687, 705, 790, 821, 964
See application file for complete search history.

(56) References Cited

U.S. PATENT DOCUMENTS

| | | |
|---|---|---|
| 5,666,502 A | 9/1997 | Capps |
| 5,946,647 A | 8/1999 | Miller et al. |
| 6,513,036 B2 | 1/2003 | Fruensgaard et al. |
| 6,832,218 B1 | 12/2004 | Emens et al. |
| 6,847,959 B1 | 1/2005 | Arrouye et al. |
| 6,944,612 B2 | 9/2005 | Roustant et al. |
| 7,502,770 B2 | 3/2009 | Hillis et al. |
| 7,562,076 B2 | 7/2009 | Kapur |
| 7,565,139 B2 | 7/2009 | Neven, Sr. et al. |
| 7,603,374 B2 | 10/2009 | Cameron et al. |
| 7,720,702 B2 | 5/2010 | Fredericks et al. |

(Continued)

FOREIGN PATENT DOCUMENTS

| | | |
|---|---|---|
| CN | 101341464 A | 1/2009 |
| CN | 102298616 A | 12/2011 |

(Continued)

OTHER PUBLICATIONS

Dekang Lin, "Dependency-based Evaluation of MINIPAR," In Workshop on the Evaluation of Parsing Systems, May 1, 1998, 14 pages, Granada, Spain.

(Continued)

*Primary Examiner* — Sana A Al-Hashemi
(74) *Attorney, Agent, or Firm* — Dority & Manning, P.A.

(57) ABSTRACT

Methods and systems are provided for updating a set of results. In some implementations, a search query associated with an entity reference is received. The entity reference corresponds to one or more distinct entities. A set of results for the search query is provided, and the set of results distinguishes between distinct entities. One or more attributes for at least one entity of the one or more distinct entities are identified based at least in part on the set of results. One or more additional search queries are identified based on the search query, the at least one entity, and the one or more attributes. An input selecting at least one of the additional search queries is received. An updated set of results is provided based on the selected additional search queries. The updated set of results comprises at least one result not in the set of results.

28 Claims, 12 Drawing Sheets

(56) References Cited

U.S. PATENT DOCUMENTS

| | | | |
|---|---|---|---|
| 7,761,414 B2 | 7/2010 | Freedman | |
| 7,765,206 B2 | 7/2010 | Hillis et al. | |
| 7,797,336 B2 | 9/2010 | Blair et al. | |
| 7,818,324 B1 | 10/2010 | Held et al. | |
| 7,895,196 B2 | 2/2011 | Mahadevan et al. | |
| 7,933,900 B2 | 4/2011 | Reddy et al. | |
| 7,974,892 B2 | 7/2011 | Fredericks et al. | |
| 8,005,720 B2 | 8/2011 | King et al. | |
| 8,051,104 B2 | 11/2011 | Weissman et al. | |
| 8,069,175 B2 | 11/2011 | Hillis et al. | |
| 8,086,604 B2 | 12/2011 | Arrouye et al. | |
| 8,140,361 B2 | 3/2012 | Fredericks et al. | |
| 8,204,856 B2 | 6/2012 | Meyer et al. | |
| 8,286,885 B1 | 10/2012 | Zehr et al. | |
| 8,316,029 B2 | 11/2012 | Lawrence | |
| 8,429,103 B1 | 4/2013 | Aradhye et al. | |
| 8,990,199 B1* | 3/2015 | Ramesh | G06F 17/30256 707/736 |
| 2002/0083038 A1 | 6/2002 | Ferrari et al. | |
| 2002/0083039 A1 | 6/2002 | Ferrari et al. | |
| 2004/0093321 A1 | 5/2004 | Roustant et al. | |
| 2006/0026147 A1 | 2/2006 | Cone et al. | |
| 2007/0055947 A1 | 3/2007 | Ostojic et al. | |
| 2007/0260594 A1 | 11/2007 | Lewak et al. | |
| 2008/0010273 A1 | 1/2008 | Frank | |
| 2008/0126143 A1 | 5/2008 | Altman et al. | |
| 2009/0058821 A1 | 3/2009 | Chaudhri et al. | |
| 2009/0171929 A1 | 7/2009 | Jing et al. | |
| 2009/0224867 A1 | 9/2009 | O'Shaughnessy et al. | |
| 2010/0070448 A1 | 3/2010 | Omoigui | |
| 2011/0119262 A1* | 5/2011 | Dexter | G06F 17/30014 707/726 |
| 2011/0137883 A1 | 6/2011 | Lagad et al. | |
| 2011/0184981 A1 | 7/2011 | Lu et al. | |
| 2011/0202493 A1 | 8/2011 | Li | |
| 2011/0258006 A1 | 10/2011 | Koetting et al. | |
| 2011/0299743 A1 | 12/2011 | Ke et al. | |
| 2012/0059745 A1 | 3/2012 | Fredericks et al. | |
| 2012/0066627 A1 | 3/2012 | Furukawa et al. | |
| 2012/0101858 A1 | 4/2012 | Depasquale et al. | |
| 2012/0101901 A1 | 4/2012 | Depasquale et al. | |
| 2012/0150572 A1 | 6/2012 | Fredericks et al. | |
| 2012/0158633 A1* | 6/2012 | Eder | G06F 19/3437 706/46 |
| 2012/0159340 A1 | 6/2012 | Bae et al. | |
| 2012/0246153 A1 | 9/2012 | Pehle | |
| 2012/0330906 A1 | 12/2012 | Fredericks et al. | |
| 2013/0054542 A1 | 2/2013 | Ollenberger et al. | |
| 2013/0096946 A1* | 4/2013 | Shah et al. | 705/3 |
| 2013/0096947 A1* | 4/2013 | Shah et al. | 705/3 |
| 2013/0110833 A1 | 5/2013 | Fredericks et al. | |
| 2013/0297689 A1* | 11/2013 | Bhat | G06F 17/2785 709/204 |

FOREIGN PATENT DOCUMENTS

| | | |
|---|---|---|
| JP | 2005165986 A | 6/2005 |
| JP | 2011186876 A | 9/2011 |
| WO | WO 2001031479 | 5/2001 |
| WO | WO 2006110480 | 10/2006 |
| WO | WO 2010120925 | 10/2010 |

OTHER PUBLICATIONS

Elliott, Bruce, U.S. Appl. No. 13/606,494, "Systems and Methods for Displaying Schedule Information," Sep. 7, 2012, pp. 1-23.

Kao, Wayne, "Telling the Story of Friendships," Facebook, Oct. 28, 2010, available at http://blog.facebook.com/blog.php-?post=443390892130, pp. 1-2.

Marie-Catherine De Marneffe, Christopher D. Manning, "Stanford Typed Dependencies Manual," Sep. 2011, 24 pages.

Rion Snow, Daniel Jurafsky, Andrew Y. Ng, "Learning Syntactic Patterns for Automatic Hypernym Discovery," 2011, 8 pages.

Tripit, "Announcing TripIt—The First Intelligent Travel Organizer for Do-It-Yourself Trip Planners," Concur Technologies Inc., Sep. 18, 2007, available at http://www.tripit.com/press/company-announcements/announcing-tripit-first-intelligent-travel-organizer-do-it-yourself-trip, pp. 1-2.

Tripit, "TripIt Brings Travel Itineraries to Mobile Phones," Concur Technologies Inc., Apr. 7, 2008, available at http://www.tripit.com/press/company-announcements/tripit-brings-travel-itineraries-mobile-phones, pp. 1-2.

Tripit, "TripIt Simplifies Business Travel and Keeps Travelers Connected on the Road," Concur Technologies Inc., Feb. 4, 2008, available at http://www.tripit.com/press/company-announcements/tripit-simplifies-business-travel-and-keeps-travelers-connected-road, pp. 1-2.

Veselin Stoyanov, Claire Cardie, Nathan Gilbert, Ellen Riloff, David Buttler, David Hysom, "Reconcile: A Coreference Resolution Research Platform," May 13, 2010, 14 pages.

International Search Report and Written Opinion of the International Searching Authority mailed by the European Patent Office dated Jun. 18, 2014 in International Application No. PCT/US2014/024271, 12 pgs.

Rabia Nuray-Turan et al., "Exploiting Web Querying for Web People Search", *ACM Transactions on Database Systems*, vol. 37, No. 1, Article 7 (Feb. 2012), 42 pgs.

Man Lan et al., "Which Who are They? People Attribute Extraction and Disambiguation in Web Search Results", *Information Systems*, V1.4 (2009), 8 pgs.

\* cited by examiner

PROVIDING SEARCH RESULTS USING AUGMENTED SEARCH QUERIES

BACKGROUND

This disclosure relates generally to providing search results in response to a search query containing an entity reference. Search engines receive search queries containing a reference to a person, such as the person's name. Results to these queries are often times not sufficiently organized, not comprehensive enough, or otherwise not presented in a useful way.

SUMMARY

In some implementations, a system receives a search query containing an entity reference, such as a person's name, that corresponds to one or more distinct entities. The system provides a set of results, where each result is associated with at least one of the distinct entities. The system uses the set of results to identify attributes of the entity and uses the identified attributes to generate additional, augmented search queries associated with the entity. The system updates the set of results based on one or more of these augmented search queries.

In some implementations, a computer-implemented method includes receiving a search query associated with an entity reference, wherein the entity reference corresponds to one or more distinct entities. The method includes providing a set of results for the search query where the set of results distinguishes between distinct entities. The method includes identifying one or more attributes of at least one entity of the one or more distinct entities based at least in part on the set of results. The method includes generating one or more additional search queries based on the search query, the at least one entity, and the one or more attributes. The method includes receiving an input selecting at least one of the one or more additional search queries and providing an updated set of results based on the selected one or more additional search queries, where the updated set of results comprises at least one result not in the set of results.

These and other implementations can each include one or more of the following features. In some implementations, generating one or more additional search queries comprises ranking the identified one or more attributes and generating one or more additional search queries based on the search query, the at least one entity, the one or more attributes, and the ranking. In some implementations, the ranking is based on frequency of occurrence. In some implementations, the ranking is based on a location of each of the one or more attributes with respect to the at least one entity in the set of results. In some implementations, the method further comprises providing to a user the one or more additional search queries. In some implementations, the receiving an input comprises receiving an input from the user.

In some implementations, a system includes one or more computers configured to perform operations. The operations include receiving a search query associated with an entity reference, wherein the entity reference corresponds to one or more distinct entities. The operations include providing a set of results for the search query where the set of results distinguishes between distinct entities. The operations include identifying one or more attributes of at least one entity of the one or more distinct entities based at least in part on the set of results. The operations include generating one or more additional search queries based on the search query, the at least one entity, and the one or more attributes.

In some implementations, a computer-implemented method includes receiving a search query associated with an entity reference, wherein the entity reference corresponds to one or more distinct entities. The method includes providing a set of results for the search query where the set of results distinguishes between distinct entities. The method includes identifying one or more attributes of at least one entity of the one or more distinct entities based at least in part on the set of results. The method includes generating one or more additional search queries based on the search query, the at least one entity, and the one or more attributes. The method includes receiving an input selecting at least one of the one or more additional search queries and providing an updated set of results based on the selected one or more additional search queries, where the updated set of results comprises at least one result not in the set of results.

DETAILED DESCRIPTION

Figure 1:
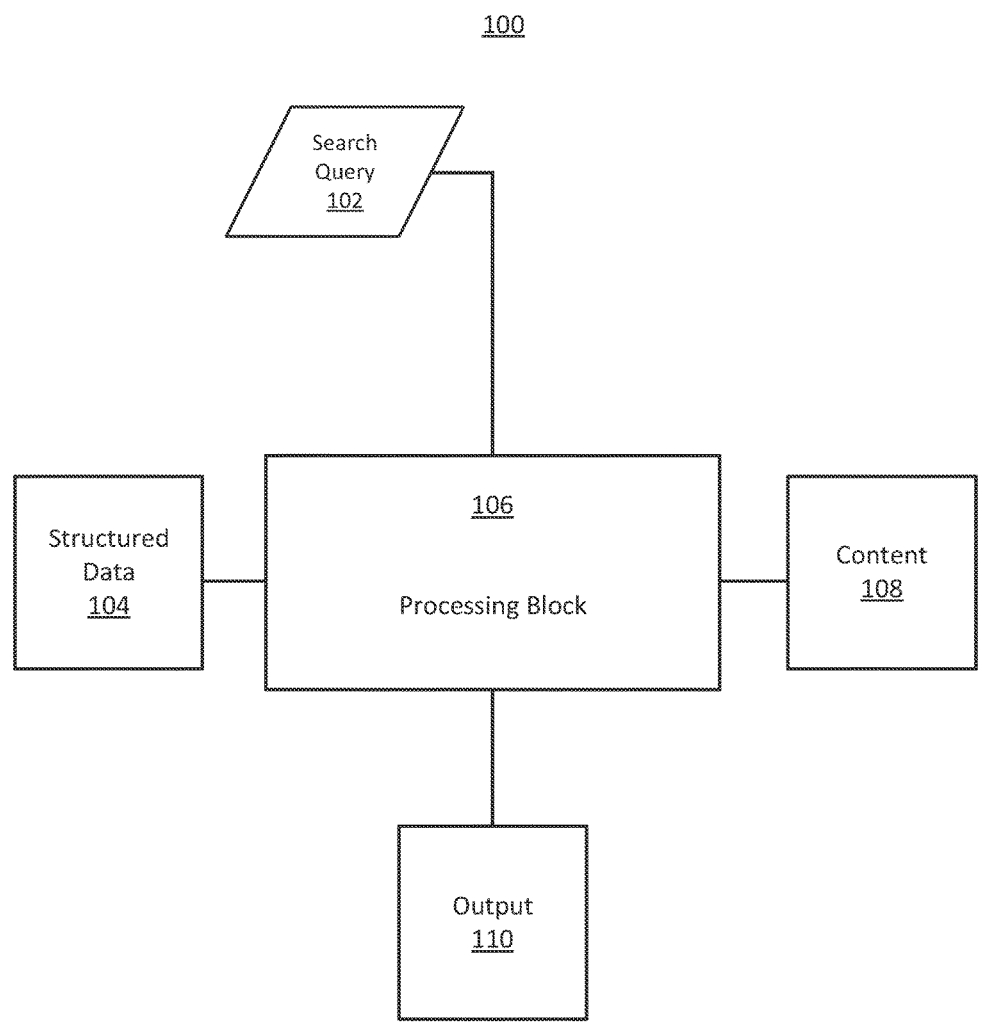
FIG. 1 is a high level block diagram of a system for providing search results in accordance with some implementations of the present disclosure.

FIG. 1 is a high level block diagram of a system for providing search results in accordance with some implementations of the present disclosure. In some implementations, a system 100 receives a search query 102 associated with an entity reference. Processing block 106 generates additional search queries, such as augmented search queries, based on an entity corresponding to the entity reference, and uses the additional search queries to provide a set of results 110 to the search query. Search queries may be textual, image-based, audio-based, video-based, based in any other suitable format, or any combination thereof. For example, system 100 may receive a textual search query in a query box. For purposes of brevity, system 100 will also be referred to herein as the system.

Entity reference, as used herein, refers to an identifier that corresponds to one or more distinct entities. Entity, as used herein, refers to a thing or concept that is singular, unique, well defined, and distinguishable. An entity reference may correspond to more than one distinct entity. For example, an entity reference may be a person's name, and corresponding entities may include distinct people who share the referenced name. For purposes of brevity and clarity, and not by way of limitation, the present disclosure is presented with respect to the entities being people and the entity references being names of or other references to people. It will be understood that any suitable type of entity, or combinations thereof, may be used in the context of the present disclosure, including, for example, a person, place, item, idea, topic, abstract concept, concrete element, other suitable thing, or any combination thereof. In an example, an entity may be the physical person John Adams, and an entity reference may be an identified that refers to John Adams, such as his name.

The system provides search results in response to a search query. Search results may be associated with an entity corresponding to an entity reference in the search query. The system may provide a set of results that distinguishes between distinct entities that correspond to the entity reference. In an example, distinct entities may include three people who are associated with the name John Adams, and the entity reference may be the name John Adams. The system may parse each result in the set of results to identify three different people associated with the name John Adams: John Adams the Second President, John Quincy Adams the Sixth President, and John Adams the artist. This parsing may be accomplished using any suitable technique.

In some implementations, the system uses natural language processing to parse a search query. As used herein, natural language refers to words, syntax, and other language such as it could be used in conversation or prose. For example, natural language may include complete sentences, questions, idiom, punctuation, any other suitable language elements or structures, or any combination thereof. For example, the question [Who was the first person to fly an airplane?] is a natural language question. In contrast, formal language follow relatively more constrained rules of grammar and syntax. An example of formal language is a computer programming language such as C or BASIC. It will be understood that queries, including natural language queries, may be in any suitable language such as English, French, Chinese, and so on. It will be understood that in some implementations, the system need not receive a natural language query and may receive a query in any suitable form. It will also be understood that the system may receive questions, provide questions for answering, receive responses, provide answers, and perform any other suitable steps using natural language, formal language, keywords, voice, video, images, any other suitable communication technique, or any combination thereof. Natural language processing is described in detail below in relation to FIG. 3.

The system identifies one or more attributes of at least one entity, where the at least one entity corresponds to the entity reference. Attribute, as used herein, refers to any feature or characteristic associated with an entity that the system may identify based on the set of results. In an example, for the entity John Adams, the system might identify, in the set of results, attributes including [second president], [Abigail Adams], and [Alien and Sedition Acts]. The system generates one or more additional queries, such as one or more augmented versions of the original search query, for an entity corresponding to the identified entity reference using the identified attributes.

Referring back to FIG. 1, system 100 includes search query block 102, structure data block 104, processing block 106, content block 108, and output block 110. System 100 may include any suitable hardware, software, or both for implementing the features described in the present disclosure and will generally be referred to, herein, as the system. In some implementations, system 100 receives a search query containing an entity reference in search query block 102. Processing block 106 processes the search query from search query block 102, data from structured data block 104, and content from content block 108 to determine a set of results that is provided to output block 110. In some implementations, processing block 106 identifies one or more entities corresponding to identical to similar entity references from the set of results and distinguishes between the distinct, identified entities. Processing block 106 identifies one or more attributes of an identified entity based on the search query from search query block 102, information from structured data block 104 and content block 108, and the set of results. Processing block 106 generates additional search queries based on the search query from search query block 102 and the identified attributes. The additional search queries may be displayed in output block 110. In some implementations, output block 110 is used to update a set of results based on the additional search queries generated in processing block 106.

Structured data block 104 may include a data structure containing structured or otherwise organized, information. In some implementations, structured data block 104 contains one or more of, data graphs, databases, indexes, any other suitable collection of content, or any combination thereof.

In some implementations, structured data block 104 includes a data graph. In some implementations, a data graph includes data organized in a graph containing nodes and edges. The data of a data graph may include information about relationships between things and concepts, and this information may be represented as nodes and edges of a graph. The nodes of a data graph each contain a piece or pieces of data and the edges represent relationships between the data contained in the nodes that the edges connect. A knowledge graph, which is a particular implementation of a data graph, is described below in FIGS. 6-8.

Content block 108 includes data related to web sites and other such searchable and/or indexed data sources. In an example, content block 108 includes an index of webpages on the internet containing text, images, videos, links, other suitable content, and any combination thereof. In some implementations, content block 108 includes information from a database, private intranet, public network, private network, any other suitable collection of information, or any combination thereof. In some implementations, content block 108 includes content used by a search engine such as a query processing engine to determine search results. It will be understood that content block 108 may include both structured and unstructured data. Content block 108 may include data derived from unstructured data. For example, content block 108 may include structured data culled from websites, i.e., unstructured data, regarding entity references and associated attributes as determined from the source websites.

System 100 provides a set of results in processing block 106 for the search query from search query block 102. System 100 may determine the set of results based on data from data block 104, data from content block 108, any other suitable data, or any combination thereof. In some implementations, processing block 106 identifies entities in the set of results that correspond to the entity reference received in search query block 102.

System 100 identifies one or more attributes for at least one entity in processing block 106. In some implementations, system 100 may select the at least one entity for which attributes will be identified in processing block 106 based on content block 106, structured data block 104, any other suitable data, or any combination thereof.

System 100 generates one or more additional search queries in processing block 106 based on the identified attributes. In some implementations, processing block 106 ranks the identified attributes and generates one or more additional search queries based on the identified attributes and the ranking. Generating additional search queries is discussed in detail below in relation to FIG. 5. In some implementations, processing block 106 provides the additional search queries to output block 110 for display.

System 100 provides an updated set of results in output block 110. System 100 may update the set of results based on one or more user-selected additional search queries in processing block 106. In some implementations, system 100 bases the selection on data from data block 104, content from content block 108, any other suitable content, or any combination thereof.

Figure 2:
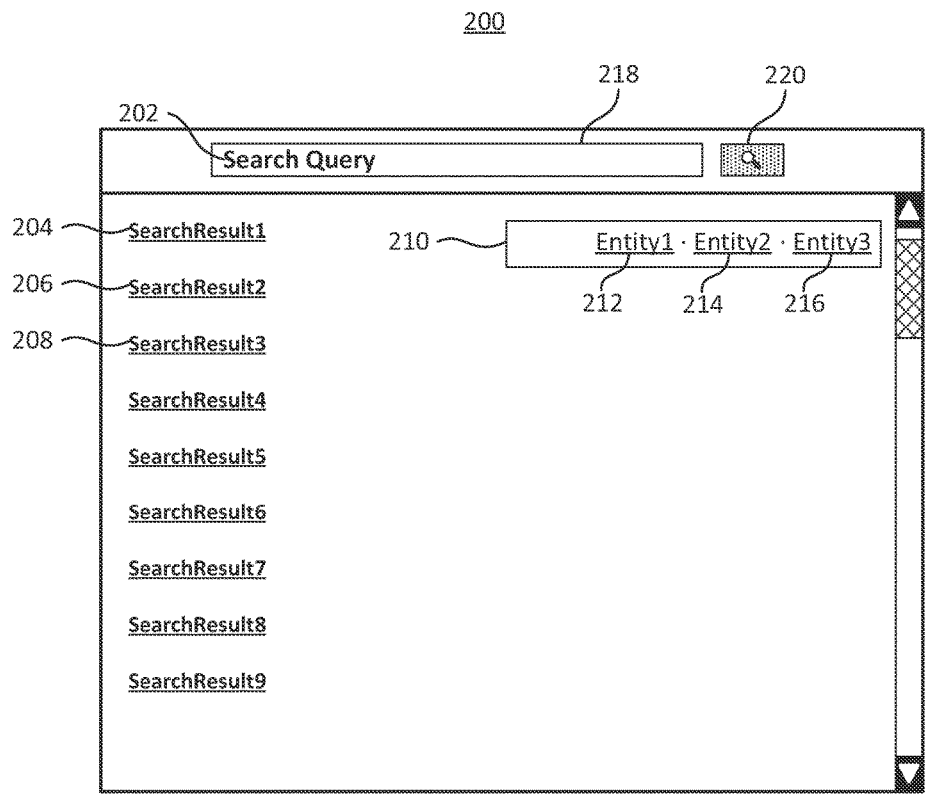
FIG. 2 shows an illustrative example of a user interface for providing a set of search results in accordance with some implementations of the present disclosure.

FIG. 2 shows an illustrative example of a user interface for providing a set of results in accordance with some implementations of the present disclosure. In some implementations, user interface 200 includes search query box 218 containing received search query 202. In some implementations, search query 202 is received using textual input, voice command, image drag-and-drop, gesture recognition, camera input, any other suitable technique, or any combination thereof. In some implementations, search button 220 receives user input indicating a desired search. The search button may be activated, for example, using input received using a mouse or touchpad, and activation of the search button causes search results to be presented. Search query 202 and corresponding search results, including, for example, SearchResult1 204, SearchResult2 206, and SearchResult3 208 are shown. The system may parse search query 202 to identify one or more associated entity references. In some implementations, the system uses natural language processing to parse a search query 202. Natural language processing is discussed in detail below in relation to FIG. 3.

In some implementations, the system identifies Entity1 212, Entity2 214, and Entity3 216 from the search results based on whether the entity reference corresponds to the entity. In some implementations, the system identifies entities 212, 214, and 216 by parsing each result in the set of results 204, 206, and 208. In some implementations, the system uses natural language processing to parse each result in the set of results. In some implementations, each result in the set of results is associated respectively with at least one entity. In some implementations, the system displays identified entities 212, 214, and 216 in entity selection panel 210. In another example, identified entities 212, 214, and 216 may be displayed in a profile card or other suitable medium for display. Entity selection box 210 may include a mechanism for selection and de-selection of entities 212, 214, and 216. In the illustrated example, entity selection panel 210 provides clickable hyperlinks for entities 212, 214, and 216, that may receive user input for selection and de-selection of the entities. In another example, checkboxes may be used for selection and de-selection of entities 212, 214, and 216. In some implementations, the system may select one or more entities, for example Entity2 214.

Figure 3:
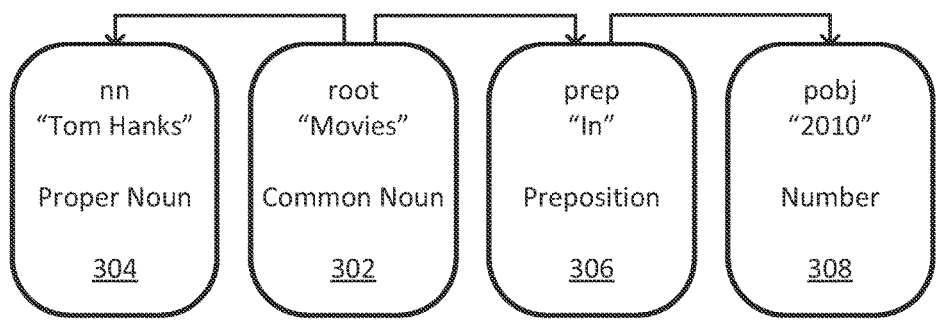
FIG. 3 shows an illustrative natural language processing diagram in accordance with some implementations of the present disclosure.

FIG. 3 shows illustrative natural language processing diagram 300 in accordance with some implementations of the present disclosure. In some implementations, the search system uses natural language processing to parse a search query. Parsing may include identifying words, parts of speech, meanings, and relationships between words in the query.

Diagram 300 shows the natural language processing of the search query "Tom Hanks Movies in 2010." In some implementations, the search system divides the query into search units "Tom Hanks" 304, "Movies" 302, "In" 306 and "2010" 308. In some implementations, the search system divides the search query based on a phrase dictionary, search history, user preferences, predetermined parameters, system settings, any other suitable parameters, or any combination thereof. In some implementations, the search system determines the part of speech of each search unit. For example, the search system may determine that "Movies" 302 is a common noun, "Tom Hanks" 304 is a proper noun, "In" 306 is a preposition, and "2010" 308 is a number. It will be understood that this particular part of speech notation is merely an example and that any suitable identification, notation, or both may be used. In some implementations, the search system determines the semantic function or dependency of the search unit in the search query. For example, the search system may determine that "Movies" 302 is the root of the query, "Tom Hanks" 304 is a noun modifier, which means that it modifies the root, "In" 306 is a preposition, and "2010" 308 is the object of the preposition. In some implementations, the search system assigns a directional relationship between the search units as illustrated in diagram 300. For example, "In" 306 and "Tom Hanks" 304 is a child node of the root "Movies" 302, and 2010 is a child of "In" 306. In some implementations, natural language processing is used to identify related nodes in a knowledge graph, uses information from the knowledge graph, relates to a data structure such as the knowledge graph in any suitable way, or any combination thereof. It will also be understood that the search system may perform natural language processing without relying on the knowledge graph.

Figure 4:
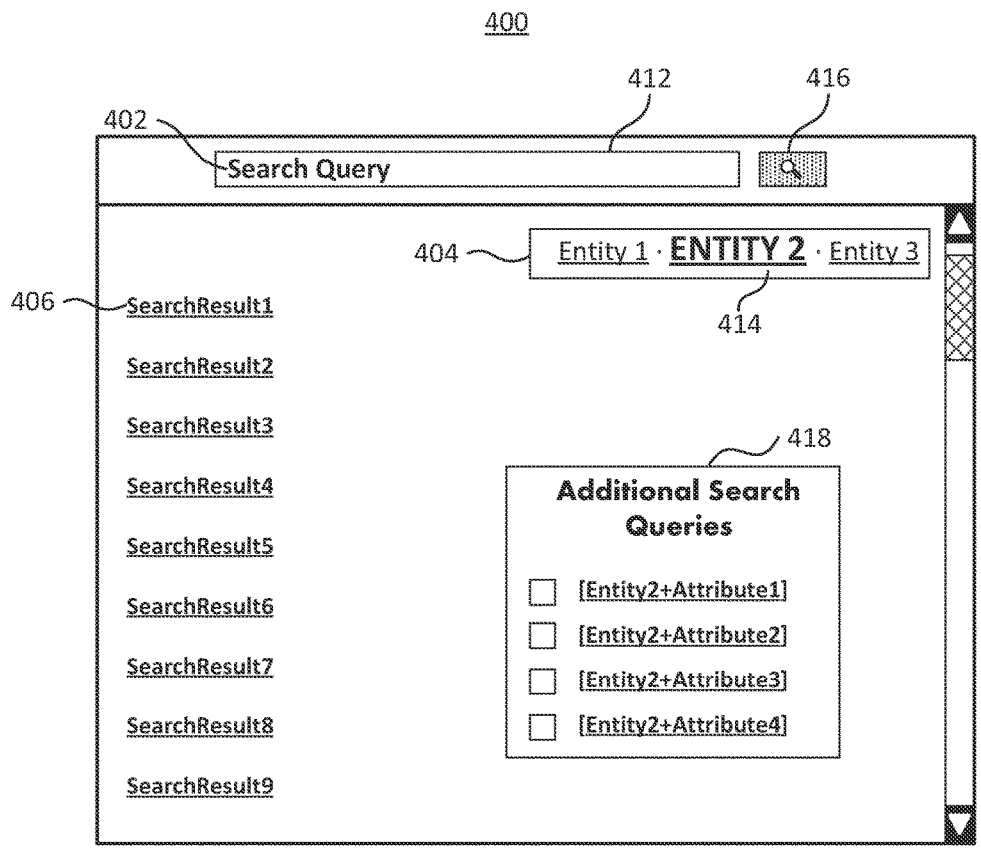
FIG. 4 shows an illustrative example of a user interface for selecting one or more augmented search queries in accordance with some implementations of the present disclosure.

FIG. 4 shows an illustrative example of a user interface 400 for providing additional search queries in accordance with some implementations of the present disclosure. In some implementations, user interface 400 includes search query box 412 and search button 416. Search query 402 is shown and corresponding identified entities are presented in entity selection panel 404. In some implementations, the system may provide search results associated with at least one selected entity. For example, Entity2 414 is shown as selected in entity selection panel 404. Search results for Entity2 414, are shown, for example, as search results 406. In some implementations, the system provides entity panel 404 for switching between entity selections and for selecting more than one entity.

The system identifies one or more attributes for selected Entity2 414. In some implementations, the system parses each result in a set of results associated with the selected entity to identify the one or more attributes. In some implementations the system uses natural language processing, as described above in relation to FIG. 3, to parse each result in a set of results. For example, in a web search engine context, the system may be configured to access and parse webpages in order to identify entity references contained in the webpages as well as attribute information associated with respective entity references also contained in the websites. Attribute information can also be derived from structured data, such as structured data 104, in which entity references are looked up and associated attribute information can be readily identified.

In some implementations, the system generates one or more additional search queries based on the search query, the at least one selected entity, and the one or more attributes. In some implementations, the system may augment the search query with the one or more attributes to generate one or more additional queries 418. In some implementations, the system ranks the one or more attributes and generates one or more additional search queries based on the search query, the at least one entity, the one or more attributes, and the ranking of the one or more attributes. In some implementations, the system may use the ranking to order the display of the one or more additional search queries. For example, the system may display a list of additional search queries, and in the list, an additional search query based on a higher ranking attribute may appear nearer the top of the list than an additional search query based on a lower ranking attribute. In some implementations the system may use the ranking to determine which of the one or more attributes to use in generating one or more additional search queries. For example, if an attribute has a particularly low ranking relative to the other of the one or more attributes, the system may determine not to use the attribute to generate an additional search query.

In some implementations, the ranking is based on the number of occurrences, frequency of occurrence, or both of one or more attributes in a document, such as a webpage, where number is an absolute count within a document and frequency is a count within the document normalized by the length of the document. In some implementations, the system determines the ranking based in part on the number of occurrence, frequency of occurrence, or both, of the one or more attributes across a number of documents. In an example, an attribute occurring at a location proximate to the selected entity may be ranked higher than an attribute occurring at a location distal to the selected entity. The location with respect to the layout of the document may be based on, for example, whether an attribute occurs at the top of the page, in the first sentence of a paragraph, within a title, within a picture caption, or in any other suitably prominent place in the document. In some implementations, the system determines the ranking based in part on one or more of the location, number of occurrence, and frequency of occurrence.

In some implementations, the system determines a ranking based in part on the document where the attribute occurs. For example, a webpage may be associated with a popularity score, a freshness score, a rating based on the number of hyperlinks to and from that page, a manual ranking, any other suitable metric, or any combination thereof. In some implementations, the system determines the ranking based in part on one or more of those document rankings.

In some implementations, the system may scale, normalize, weigh, combine with other data, or otherwise adjust the ranking based on page quality, freshness, popularity, user input, system design, any other suitable criteria, or any combination thereof. In an example, the rank of a first attribute from a recently updated webpage may be weighted with a higher weight than the rank of a second attribute from an older webpage. In another example, the ranking across a number of webpages may be normalized such that each document has the same relative contribution to an aggregate ranking. In another example, ranks from highly visited webpages are assigned a higher weight than ranks from infrequently visited websites. It will be understood that any of the foregoing ranking techniques, any other suitable ranking technique, or combination thereof, may be used to determine a ranking of the one or more attributes. In some implementations, the system displays the one or more additional search queries, for example, on the search screen in query selection box 418.

Figure 5:
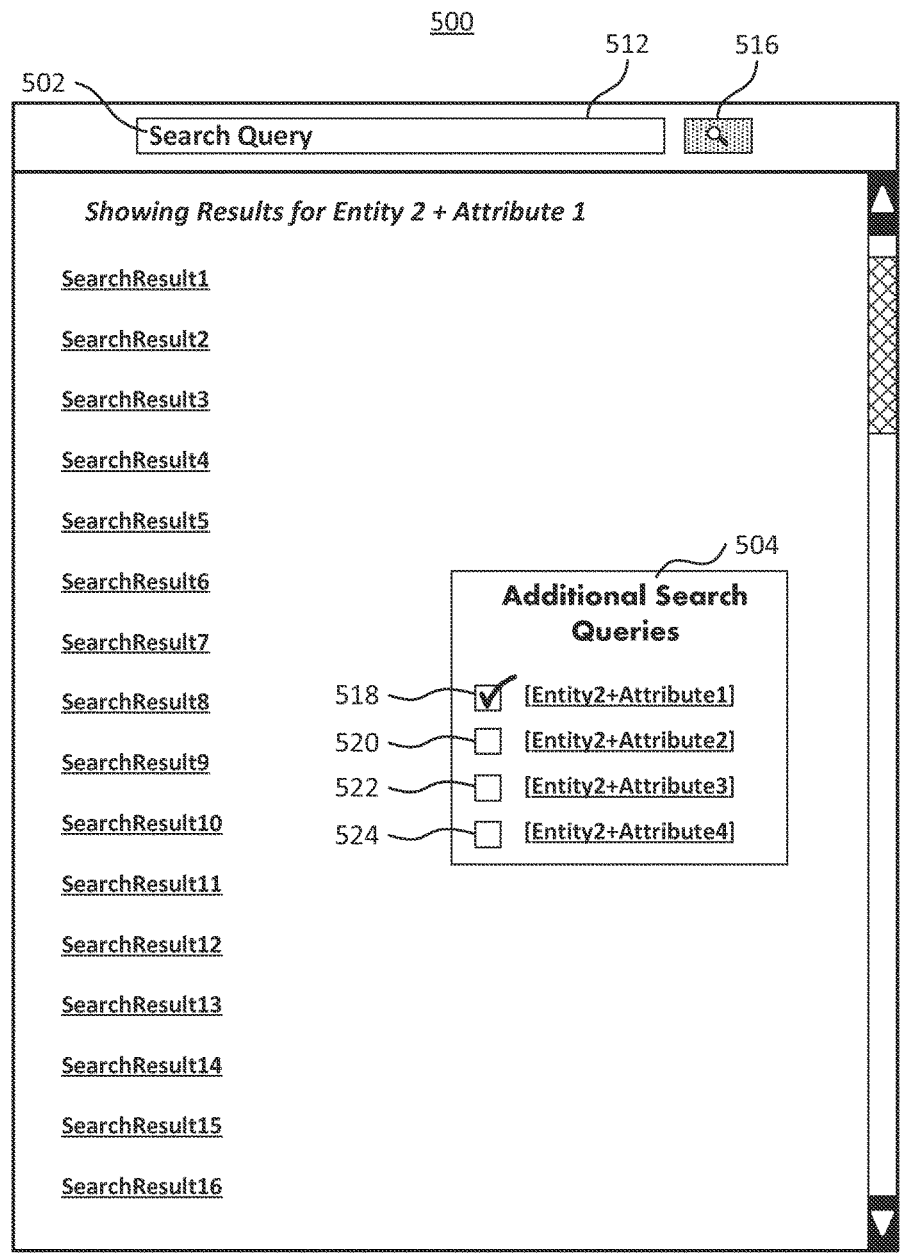
FIG. 5 shows an illustrative example of a user interface for updating search results in accordance with some implementations of the present disclosure.

FIG. 5 shows an illustrative example of a user interface 500 for updating search results in accordance with some implementations of the present disclosure. In some implementations, user interface 500 includes search query box 512 and search button 516. One or more additional search queries, for example, [Entity2+Attribute1] 518, [Entity2+Attribute2] 520, [Entity2+Attribute3] 522, [Entity2+Attribute4] 524, are shown in query selection box 504. In some implementations, the system provides a mechanism for selection and de-selection of the one or more additional search queries. For example, checkboxes are an exemplary mechanism for selection and de-selection of the one or more additional search queries. [Entity2+Attribute1] 518 is shown as selected in the illustrated example. In some implementations, the system provides an updated set of search results using the at least one selected additional search query. More particularly, the system provides search results for the search query represented by selected query 518 in place of the original search query 502. This effectively allows a user to perform a more comprehensive search on an entity having a specific attribute that may not have been explicit in the original search query 502, and therefore may not have resulted in as many useful results when searched based on original search query 502.

Figure 6:
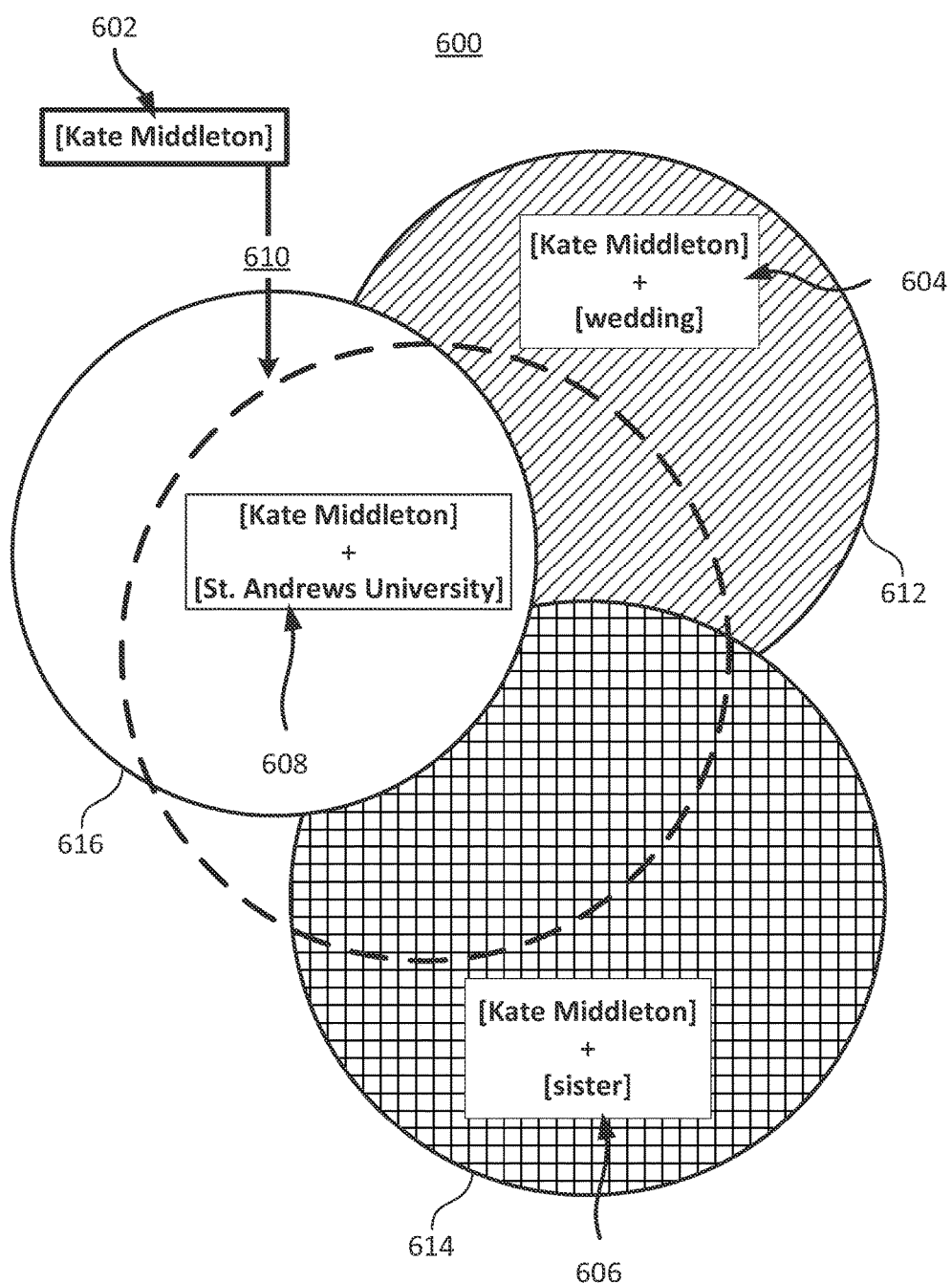
FIG. 6 is an exemplary diagram of augmented search queries in accordance with some implementations of the present disclosure.

FIG. 6 is exemplary diagram 600 of illustrative additional search queries in accordance with some implementations of the present disclosure. The illustrated diagram shows how the system can process an original search query for [Kate Middleton] in order to generate and augmented search queries [Kate Middleton]+[wedding], [Kate Middleton]+[St. Andrews University], and [Kate Middleton]+[sister]. Additional search queries 604, 606, and 608 are shown with respective corresponding circles 612, 614, and 616 corresponding to respective sets of results are shown. In the illustrated example, a set of results for selected entity [Kate Middleton] 602 is shown in as an ellipse with a dashed line. The system identifies three attributes of [Kate Middleton] from the set of results for the selected entity [Kate Middleton] 602. In the example, three identified attributes—[St. Andrews University], [wedding], and [sister]—are shown. The system generates an additional search query for each of the identified attributes. In the illustrated example, additional search queries [Kate Middleton]+[St. Andrews University] 608, [Kate Middleton]+[sister] 606, and [Kate Middleton]+[wedding] 604 are shown. The system may provide these three additional search queries to a user for selection of one or more to be used to update the set of results. For example, updating the set of results based on additional search query [Kate Middleton]+[sister] 606 would result in the updated set of results represented by the corresponding checkered circle 606. Generally, it will be understood that each of the one or more additional search queries may result in updated sets of results that overlap with one or more of the other additional search queries. For example, a webpage discussing Kate Middleton's wedding and her sister Pippa Middleton as the maid of honor may appear in the updated set of results for additional query [Kate Middleton]+[sister] 606 and in the updated set of results for additional query [Kate Middleton]+[wedding] 604. It will also be understood that the updated set of results for each of the one or more additional queries includes at least one reference that is not in the set of results for the at least one entity. As shown in the illustrated example, the circle with the dashed line corresponding to the set of results associated with the entity [Kate Middleton] 602 includes some but not all results found in each of the three updated set of results 612, 614, and 616 for additional search queries 604, 606, and 608. In an example, the additional search query [Kate Middleton]+[sister] would return the set of results shown in the figure as a checkered circle 606, which includes webpages that are within and without the set of results 610 for [Kate Middleton] 602.

Figure 7:
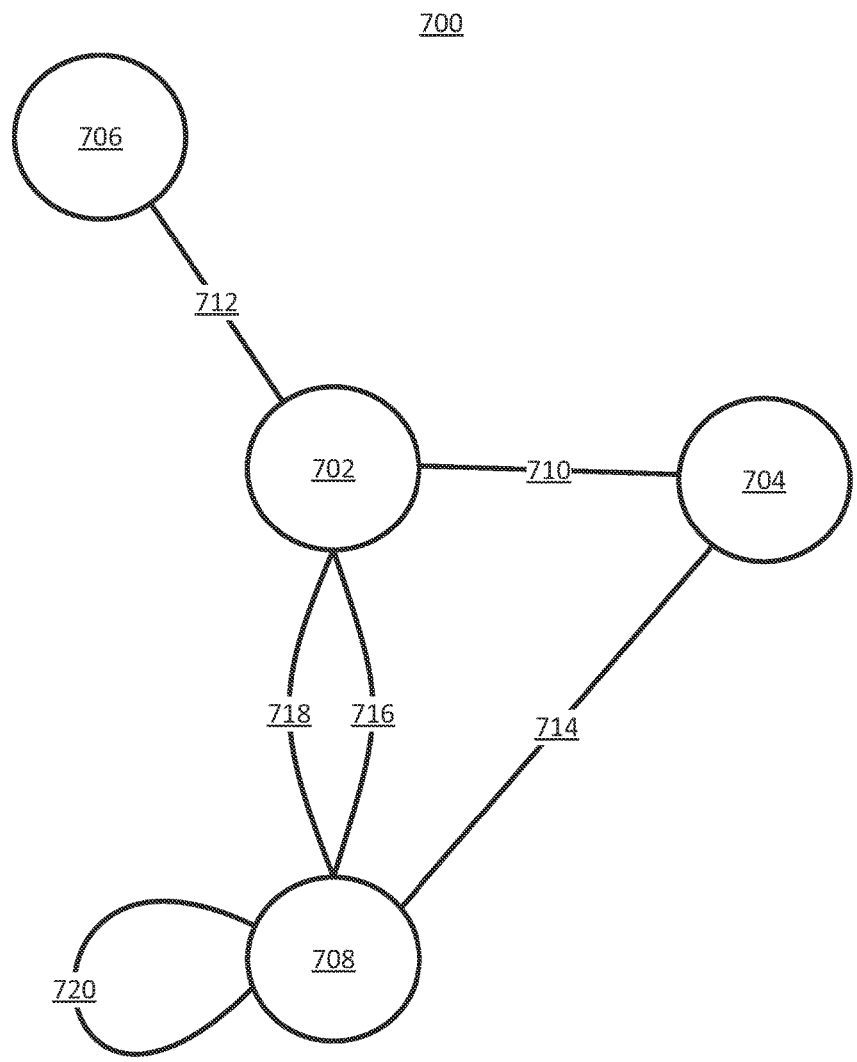
FIG. 7 shows an illustrative knowledge graph portion containing nodes and edges in accordance with some implementations of the present disclosure.

FIG. 7 shows an illustrative data graph containing nodes and edges in accordance with some implementations of the present disclosure. In some implementations, data in data structure 104 of FIG. 1 is stored as a data graph. In some implementations, illustrative data graph 700 is a portion of a knowledge graph. The knowledge graph is a particular implementation of a data graph and will be described in further detail in relation to FIGS. 8 and 9 below. It will be understood that the data graph implementation of FIG. 6, and the knowledge graph, are merely examples of a data structure that may be used by the system to store entity references and other data, and that any suitable data format may be used. For example, data in data structure 104 of FIG. 1 may be stored as a list of entities and associated entity types. Data stored by the data structure may include any suitable data such as references to data, text, images, characters, computer files, databases, any other suitable data, or any combination thereof. It will be understood that in some implementations, the node and edge description is merely illustrative and that the construction of the data structure may include any suitable technique for describing information and relationships. In an example, nodes may be assigned a unique identification number, and an edge may be described using the identification numbers that a particular edge connects. It will be understood that the representation of data as a graph is merely exemplary and that data may be stored, for example, as a computer file including pieces of data and links and/or references to other pieces of data.

In some implementations, data may be organized in a database using any one or more data structuring techniques. For example, data may be organized in a graph containing nodes connected by edges. In some implementations, the data may include statements about relationships between things and concepts, and those statements may be represented as nodes and edges of a graph. The nodes each contain a piece or pieces of data and the edges represent relationships between the data contained in the nodes that the edges connect. In some implementations, the graph includes one or more pairs of nodes connected by an edge. The edge, and thus the graph, may be directed, i.e. unidirectional, undirected, i.e. bidirectional, or both, i.e. one or more edges may be undirected and one or more edges may be directional in the same graph. Nodes may include any suitable data or data representation. Edges may describe any suitable relationships between the data. In some implementations, an edge is labeled or annotated, such that it includes both the connection between the nodes, and descriptive information about that connection. A particular node may be connected by distinct edges to one or more other nodes, or to itself, such that an extended graph is formed. For purposes of clarity, a graph based on the structure described immediately above is referred to herein as a knowledge graph. In some implementations, the knowledge graph may be a useful for representing information and in providing information in search.

FIG. 7 shows an illustrative data graph containing nodes and edges in accordance with some implementations of the present disclosure. In some implementations, illustrative data graph 700 is a portion of a knowledge graph. The knowledge graph will be described in further detail in relation to FIGS. 8 and 9 below. It will be understood that the data graph implementation of FIG. 7, and in particular the knowledge graph, is merely an example of a data structure that may be used by the system and that any suitable data structure or data format may be used. Data stored by the data structure may include any suitable data such as references to data, text, images, characters, computer files, databases, any other suitable data, or any combination thereof. It will be understood that in some implementations, the node and edge description is merely illustrative and that the construction of the data structure may include any suitable technique for describing information and relationships. In an example, nodes may be assigned a unique identification number, and an edge may be described using the identification numbers that a particular edge connects. It will be understood that the representation of data as a graph is merely exemplary and that data may be stored, for example, as a computer file including pieces of data and links and/or references to other pieces of data.

In some implementations, data may be organized in a database using any one or more data structuring techniques. For example, data may be organized in a graph containing nodes connected by edges. In some implementations, the data may include statements about relationships between things and concepts, and those statements may be represented as nodes and edges of a graph. The nodes each contain a piece or pieces of data and the edges represent relationships between the data contained in the nodes that the edges connect. In some implementations, the graph includes one or more pairs of nodes connected by an edge. In some implementations, the edge, and thus the graph, may be directed, undirected, or both. In an example, directed edges form a unidirectional connection. In an example, undirected edges form bidirectional connections. In an example, a combination of both directed and undirected edges may be included in the same graph. Nodes may include any suitable data or data representation. Edges may describe any suitable relationships between the data. In some implementations, an edge is labeled or annotated, such that it includes both the connection between the nodes, and descriptive information about that connection. It will be understood that in some implementations, edges between data sources need not be labeled. A particular node may be connected by distinct edges to one or more other nodes, or to itself, such that an extended graph is formed.

In some implementations, the grouping of an edge and two nodes is referred to as a triple. The triple represents the relationship between the nodes, or in some implementations, between the node and itself. In some implementations, higher order relationships are modeled, such as quaternary and n-ary relationships, where n is an integer greater than 2. In some implementations, information modeling the relationship is stored in a node, which may be referred to as a mediator node. In an example, the information "Person X Donates Artifact Y To Museum Z" is stored in a mediator node connected entity nodes to X, Y, and Z, where each edge identifies the role of each respective connected entity node.

Illustrative graph 700 includes nodes 702, 704, 706, and 708. Data graph 700 includes edge 710 connecting node 702 and node 704. Data graph 700 includes edge 712 connecting node 702 and node 706. Data graph 700 includes edge 714 connecting node 704 and node 708. Data graph 700 includes edge 716 and edge 718 connecting node 702 and node 708. Data graph 700 includes edge 720 connecting node 708 to itself. Each aforementioned group of an edge and one or two distinct nodes may be referred to as a triple or 3-tuple. As illustrated, node 702 is directly connected by edges to three other nodes, while nodes 704 and 708 are directly connected by edges to two other nodes. Node 706 is connected by an edge to only one other node, and in some implementations, node 706 is referred to as a terminal node. As illustrated, nodes 702 and 708 are connected by two edges, indicating that the relationship between the nodes is defined by more than one property. As illustrated, node 708 is connected by edge 720 to itself, indicating that a node may relate to itself. While illustrative data graph 700 contains edges that are not labeled as directional, it will be understood that each edge may be unidirectional or bidirectional. It will be understood that this example of a graph is merely an example and that any suitable size or arrangement of nodes and edges may be employed.

Figure 8:
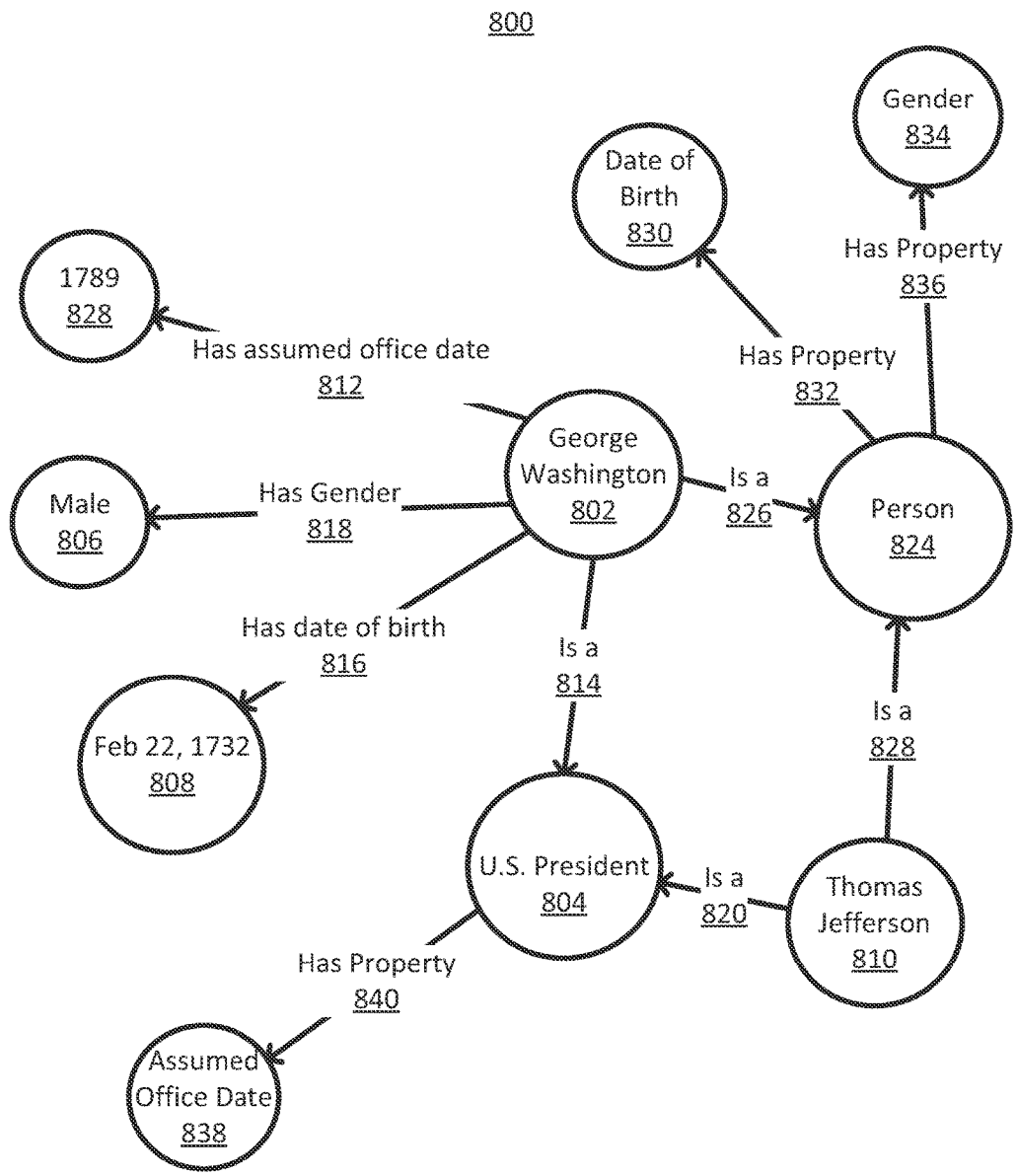
FIG. 8 shows an illustrative knowledge graph portion in accordance with some implementations of the present disclosure.

FIG. 8 shows illustrative knowledge graph portion 800 in accordance with some implementations of the present disclosure. A knowledge graph is a particular implementation of a data graph as illustrated above in relation to data graph 700 of FIG. 7.

Generally, nodes in a knowledge graph can be grouped into several categories. Nodes may represent, for example, entities, organizational data such as entity types and properties, literal values, and models of relationships between other nodes.

An edge in a knowledge graph may represent a semantic connection defining a relationship between two nodes. The edge may represent a prepositional statement such as [Is A], [Has A], [Is Of A Type], [Has Property], [Has Value], any other suitable statement, or any combination thereof. For example, the entity node of a particular person may be connected by a [Date Of Birth] edge to a terminal node containing a literal of his or her specific date of birth. In some implementations, the properties defined by edge connections of an entity may relate to nodes connected to the type of that entity. For example, the entity type node [Movie] may be connected to entity nodes [Actor] and [Director], and a particular movie may be connected by an edge property [Has Actor] to an entity node representing a particular actor.

In some implementations, a node of a knowledge graph represents an entity. An entity is a thing or concept that is singular, unique, well-defined and distinguishable. For example, an entity may be a person, place, item, idea, abstract concept, concrete element, other suitable thing, or any combination thereof. It will be understood that in some implementations, the data graph contains an entity reference, and not the physical embodiment of the entity. For example, an entity may be the physical embodiment of George Washington, while an entity reference is an abstract concept that refers to George Washington. In another example, the entity "New York City" refers to the physical city, and the data graph uses a concept of the physical city as represented by, for example, an element in a data structure, the name of the entity, any other suitable element, or any combination thereof. Where appropriate, based on context, it will be understood that the term entity as used herein may correspond to an entity reference, and the term entity reference as used herein may correspond to an entity.

Generally, entities include things or concepts represented linguistically by nouns. For example, the color [Blue], the city [San Francisco], and the imaginary animal [Unicorn] may each be entities. An entity reference generally refers to the concept of the entity. For example, the entity reference [New York City] refers to the physical city, and the data graph uses a concept of the physical city as represented by, for example, an element in a data structure, the name of the entity, any other suitable element, or any combination thereof.

In some implementations, a node representing organizational data may be included in a knowledge graph. These may be referred to herein as entity type nodes. As used herein, an entity type node may refer to a node in a knowledge graph, while an entity type may refer to the concept represented by an entity type node. An entity type may be a defining characteristic of an entity. For example, entity type node Y may be connected to an entity node X by an [Is A] edge or link, discussed further below, such that the graph represents the information "The Entity X Is Type Y." For example, the entity node [George Washington] may be connected to the entity type node [President]. An entity node may be connected to multiple entity type nodes, for example, [George Washington] may also be connected to entity type node [Person] and to entity type node [Military Commander]. In another example, the entity type node [City] may be connected to entity nodes [New York City] and [San Francisco]. In another example, the concept [Tall People], although incompletely defined as a definition of the property [tall] is not necessarily known, may exist as an entity type node. In some implementations, the presence of the entity type node [Tall People], and other entity type nodes, may be based on user interaction.

In some implementations, an entity type node may include or be connected to data about: a list of properties associated with that entity type node, the domain to which that entity type node belongs, descriptions, values, any other suitable information, or any combination thereof. A domain refers to a collection of related entity types. For example, the domain [Film] may include, for example, the entity types [Actor], [Director], [Filming Location], [Movie], any other suitable entity type, or any combination thereof. In some implementations, entities are associated with types in more than one domain. For example, the entity node [Benjamin Franklin] may be connected with the entity type node [Politician] in the domain [Government] as well as the entity type node [Inventor] in the domain [Business].

In some implementations, a node may include or connect to data defining one or more attributes. These may be referred to as attribute references and/or properties. The attribute references may define a particular characteristic of the node. The particular attribute references of a node may depend on what the node represents. In some implementations, an entity reference node may include or connect to: attribute references describing the entity reference, a unique identification reference, a list of entity types associated with the node, a list of differentiation aliases for the node, data associated with the entity reference, a textual description of the entity reference, links to a textual description of the entity reference, other suitable information, or any combination thereof. As described above, nodes may contain a reference or link to long text strings and other information stored in one or more documents external to the data graph. In some implementations, the storage technique may depend on the particular information. For example, a unique identification reference may be stored within the node, a short information string may be stored in a terminal node as a literal, and a long description of an entity may be stored in an external document linked to by a reference in the data graph.

Specific values, in some implementations referred to as literals, may be associated with a particular entity in a terminal node by an edge defining the relationship. Literals may refer to values and/or strings of information. For example, literals may include dates, names, and/or numbers. In an example, the entity node [San Francisco] may be connected to a terminal node containing the literal [813000] by an edge annotated with the property [Has Population]. In some implementations, terminal nodes may contain a reference or link to long text strings and other information stored in one or more documents external to the knowledge graph. In some implementations, literals are stored as nodes in the knowledge graph. In some implementations, literals are stored in the knowledge graph but are not assigned a unique identification reference as described below, and are not capable of being associated with multiple entities. In some implementations, literal type nodes may define a type of literal, for example [Date/Time], [Number], or [GPS Coordinates].

In some implementations, nodes and edges define the relationship between an entity type node and its properties, thus defining a schema. For example, an edge may connect an entity type node to a node associated with a property, which may be referred to as a property node. Entities of the type may be connected to nodes defining particular values of those properties. For example, the entity type node [Person] may be connected to property node [Date of Birth] and a node [Height]. Further, the node [Date of Birth] may be connected to the literal type node [Date/Time], indicating that literals associated with [Date of Birth] include date/time information. The entity node [George Washington], which is connected to entity type node [Person] by an [Is A] edge, may also be connected to a literal [Feb. 22, 1732] by the edge [Has Date Of Birth]. In some implementations, the entity node [George Washington] is connected to a [Date Of Birth] property node. It will be understood that in some implementations, both schema and data are modeled and stored in a knowledge graph using the same technique. In this way, both schema and data can be accessed by the same search techniques. In some implementations, schemas are stored in a separate table, graph, list, other data structure, or any combination thereof. It will also be understood that properties may be modeled by nodes, edges, literals, any other suitable data, or any combination thereof.

For example, the entity node [George Washington] may be connected by an [Is A] edge to the entity type node representing [Person], thus indicating an entity type of the entity, and may also be connected to a literal [Feb. 22, 1732] by the edge [Has Date Of Birth], thus defining a property of the entity. In this way, the knowledge graph defines both entity types and properties associated with a particular entity by connecting to other nodes. In some implementations, [Feb. 22, 1732] may be a node, such that it is connected to other events occurring on that date. In some implementations, the date may be further connected to a year node, a month node, and a day of node. It will be understood that this information may be stored in any suitable combination of literals, nodes, terminal nodes, interconnected entities, any other suitable arrangement, or any combination thereof.

In some implementations, entity types, properties, and other suitable content is created, defined, redefined, altered, or otherwise generated by any suitable technique. For example, content may be generated by manual user input, by automatic responses to user interactions, by importation of data from external sources, by any other suitable technique, or any combination thereof. For example, if a commonly searched for term is not represented in the knowledge graph, one or more nodes representing that node may be added. In another example, a user may manually add information and organizational structures.

In some implementations, the knowledge graph may include information for differentiation and disambiguation of terms and/or entities. As used herein, differentiation refers to the many-to-one situation where multiple names are associated with a single entity. As used herein, disambiguation refers to the one-to-many situation where the same name is associated with multiple entities. In some implementations, nodes may be assigned a unique identification reference. In some implementations, the unique identification reference may be an alphanumeric string, a name, a number, a binary code, any other suitable identifier, or any combination thereof. The unique identification reference may allow the system to assign unique references to nodes with the same or similar textual identifiers. In some implementations, the unique identifiers and other techniques are used in differentiation, disambiguation, or both. For example, there may be an entity reference node related to the city [Philadelphia], an entity reference node related to the movie [Philadelphia], and an entity reference node related to the cream cheese brand [Philadelphia]. Each of these nodes may have a unique identification reference, stored for example as a number, for disambiguation within the data graph. In some implementations, disambiguation in the data graph is provided by the connections and relationships between multiple nodes. For example, the city [New York] may be disambiguated from the state [New York] because the city is connected to an entity type [City] and the state is connected to an entity type [State]. It will be understood that more complex relationships may also define and disambiguate nodes. For example, a node may be defined by associated entity types, by other entity references connected to it by particular properties, by its name, by any other suitable information, or any combination thereof. These connections may be useful in disambiguating, for example, the node [Georgia] that is connected to the node [United States] may be understood represent the U.S. State, while the node [Georgia] connected to the nodes [Asia] and [Eastern Europe] may be understood to represent the country in eastern Europe.

Knowledge graph portion 800 includes information related to the entity [George Washington], represented by [George Washington] node 802. [George Washington] node 802 is connected to [U.S. President] entity type node 804 by [Is A] edge 814 with the semantic content [Is A], such that the 3-tuple defined by nodes 802 and 804 and the edge 814 contains the information "George Washington is a U.S. President." Similarly, "Thomas Jefferson Is A U.S. President" is represented by the tuple of [Thomas Jefferson] node 810, [Is A] edge 820, and [U.S. President] node 804. Knowledge graph portion 800 includes entity type nodes [Person] 824, and [U.S. President] node 804. The person type is defined in part by the connections from [Person] node 824. For example, the type [Person] is defined as having the property [Date Of Birth] by node 830 and edge 832, and is defined as having the property [Gender] by node 834 and edge 836. These relationships define in part a schema associated with the entity type [Person].

[George Washington] node 802 is shown in knowledge graph portion 800 to be of the entity types [Person] and [U.S. President], and thus is connected to nodes containing values associated with those types. For example, [George Washington] node 802 is connected by [Has Gender] edge 818 to [Male] node 806, thus indicating that "George Washington has gender Male." Further, [Male] node 806 may be connected to the [Gender] node 834 indicating that "Male Is A Type Of Gender." Similarly, [George Washington] node 802 is be connected by [Has Date of Birth] edge 816 to [Feb. 22, 1732] node 808, thus indicating that "George Washington Has Date Of Birth Feb. 22, 1732." [George Washington] node 802 may also be connected to [1789] node 828 by [Has Assumed Office Date] edge 812.

Knowledge graph portion 800 also includes [Thomas Jefferson] node 810, connected by [Is A] edge 820 to entity type [U.S. President] node 804 and by [Is A] edge 828 to [Person] entity type node 824. Thus, knowledge graph portion 800 indicates that "Thomas Jefferson" has the entity types "U.S. President" and "Person." In some implementations, [Thomas Jefferson] node 810 is connected to nodes not shown in FIG. 8 referencing his date of birth, gender, and assumed office date.

It will be understood that knowledge graph portion 800 is merely an example and that it may include nodes and edges not shown. For example, [U.S. President] node 804 may be connected to all of the U.S. Presidents. [U.S. President] node 804 may also be connected to properties related to the entity type such as a duration of term, for example [4 Years], a term limit, for example [2 Terms], a location of office, for example [Washington D.C.], any other suitable data, or any combination thereof. For example, [U.S. President] node 804 is connected to [Assumed Office Date] node 838 by [Has Property] edge 840, defining in part a schema for the type [U.S. President]. Similarly, [Thomas Jefferson] node 810 may be connected to any suitable number of nodes containing further information related to his illustrated entity type nodes [U.S. President], and [Person], and to other entity type nodes not shown such as [Inventor], [Vice President], and [Author]. In a further example, [Person] node 824 may be connected to all entities in the knowledge graph with the type [Person]. In a further example, [1789] node 828 may be connected to all events in the knowledge graph with the property of year [1789]. [1789] node 828 is unique to the year 1789, and disambiguated from, for example, a book entitled [1789], not shown in FIG. 8, by its unique identification reference. In some implementations, [1789] node 828 is connected to the entity type node [Year].

Figure 9:
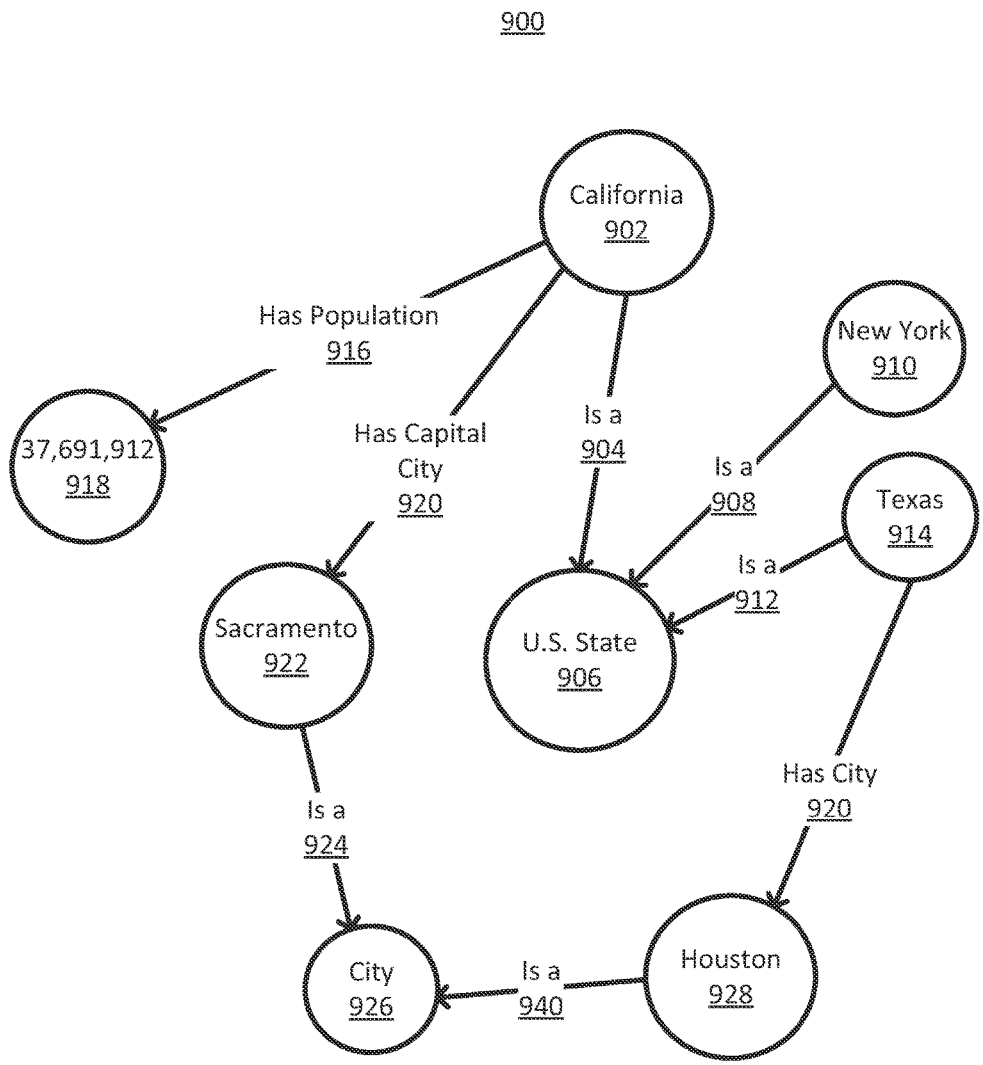
FIG. 9 shows an illustrative knowledge graph portion in accordance with some implementations of the present disclosure.

FIG. 9 shows illustrative knowledge graph portion 900 in accordance with some implementations of the present disclosure. Knowledge graph portion 900 includes [California] node 402, which may also be associated with differentiation aliases such as, for example, [CA], [Calif.], [Golden State], any other suitable differentiation aliases, or any combination thereof. In some implementations, these differentiations are stored in [California] node 902. California is connected by [Is A] edge 904 to the [U.S. State] entity type node 906. [New York] node 910 and [Texas] node 914 are also connected to [U.S. State] node 906 by [Is A] edges 908 and 912, respectively. [California] node 902 is connected by [Has Capital City] edge 920 to [Sacramento] node 922, indicating the information that "California Has Capital City Sacramento." Sacramento node 922 is further connected by [Is A] edge 924 to the [City] entity type node 926. Similarly, [Texas] node 914 is connected by [Has City] edge 920 to [Houston] node 928, which is further connected to the [City] entity type node 926 by [Is A] edge 840. [California] node 902 is connected by [Has Population] edge 916 to node 918 containing the literal value [37,691,912]. In an example, the particular value [37,691,912] may be periodically automatically updated by the knowledge graph based on an external website or other source of data. Knowledge graph portion 900 may include other nodes not shown. For example, [U.S. State] entity type node 906 may be connected to nodes defining properties of that type such as [Population] and [Capital City]. These type—property relationships may be used to define other relationships in knowledge graph portion 900 such as [Has Population] edge 916 connecting entity node [California] 902 with terminal node 918 containing the literal defining the population of California.

It will be understood that while knowledge graph portion 800 of FIG. 8 and knowledge graph portion 900 of FIG. 9 show portions of a knowledge graph, all pieces of information may be contained within a single graph and that these selections illustrated herein are merely an example. In some implementations, separate knowledge graphs are maintained for different respective domains, for different respective entity types, or according to any other suitable delimiting characteristic. In some implementations, separate knowledge graphs are maintained according to size constraints. In some implementations, a single knowledge graph is maintained for all entities and entity types.

A knowledge graph, or any other suitable data structure, may be implemented using any suitable software constructs. In an example, a knowledge graph is implemented using object oriented constructs in which each node is an object with associated functions and variables. Edges, in this context, may be objects having associated functions and variables. In some implementations, data contained in a knowledge graph, pointed to by nodes of a knowledge graph, or both, is stored in any suitable one or more data repositories across one or more servers located in one or more geographic locations coupled by any suitable network architecture.

Figure 10:
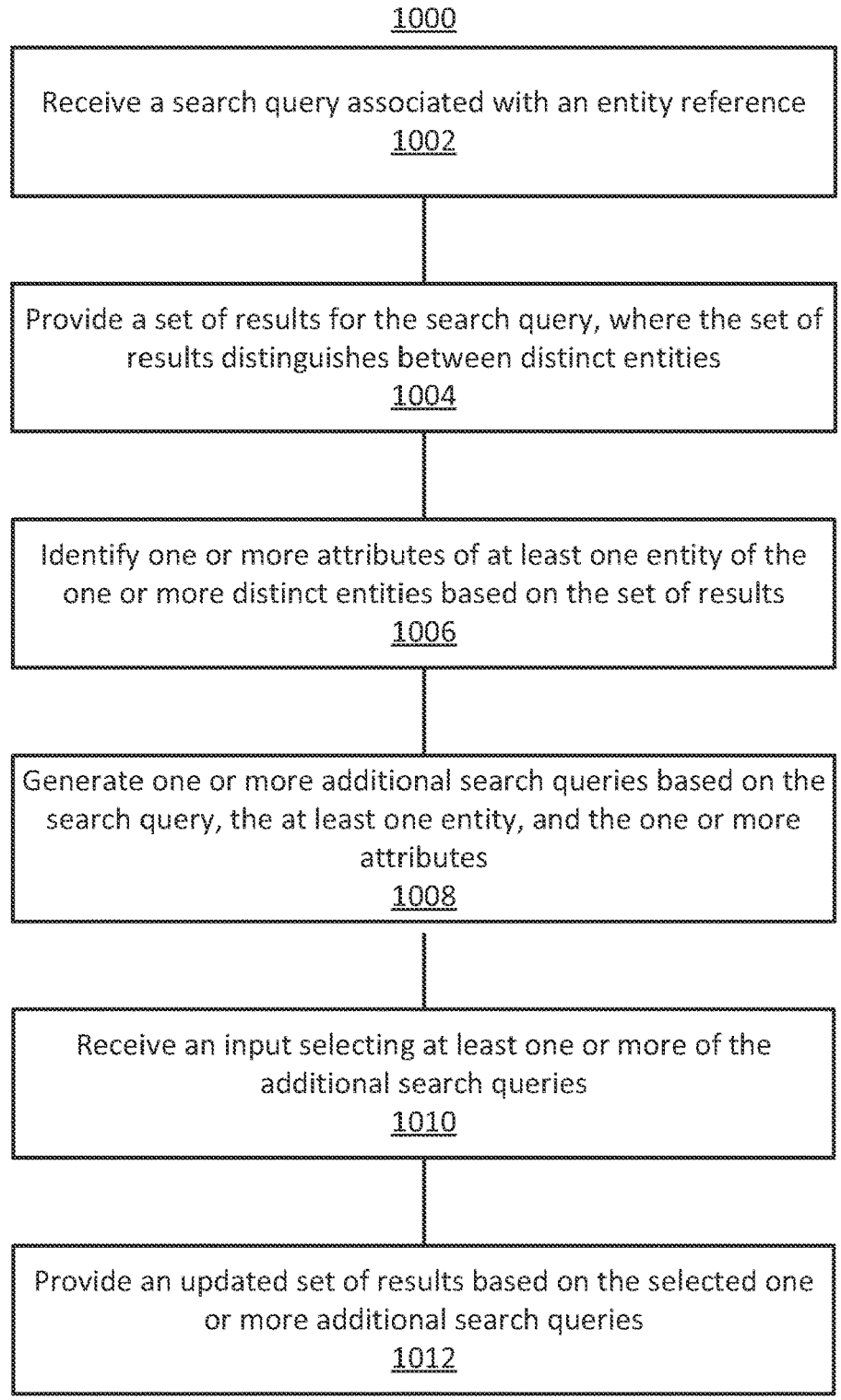
FIG. 10 shows a flow diagram of illustrative steps for providing search results in accordance with some implementations of the present disclosure.

FIG. 10 shows a flow diagram 1000 of illustrative steps for providing search results in accordance with some implementations of the present disclosure. Illustrative steps to receive a search query associated with an entity reference 1002, provide a set of results for the search query, where the set of results distinguishes between distinct entities 1004, identify one or more attributes of at least one entity of the one or more distinct entities based on the set of results 1006, generate one or more additional search queries based on the search query, the at least one entity, and the one or more attributes 1008, receive an input selecting at least one or more of the additional search queries 1010, and provide an updated set of results based on the selected one or more additional search queries 1012.

In some implementations, the system may implement steps 1004, 1006, and 1008 based at least in part on the knowledge graph, or any other suitable data graph, as discussed in detail in relation to FIGS. 7-9. For example, the knowledge graph may be used as a source of data for structured data block 104 of FIG. 1.

In some implementations, the system may be used to provide search results based on medical related search queries. For example, if a search query is provided to the system that includes an entity reference related to a particular health condition, then the system may provide augmented queries that contain that entity reference plus related attributes. This allows a user to perform more comprehensive searches based on aspects of a medical condition that is more relevant to that user.

Figure 11:
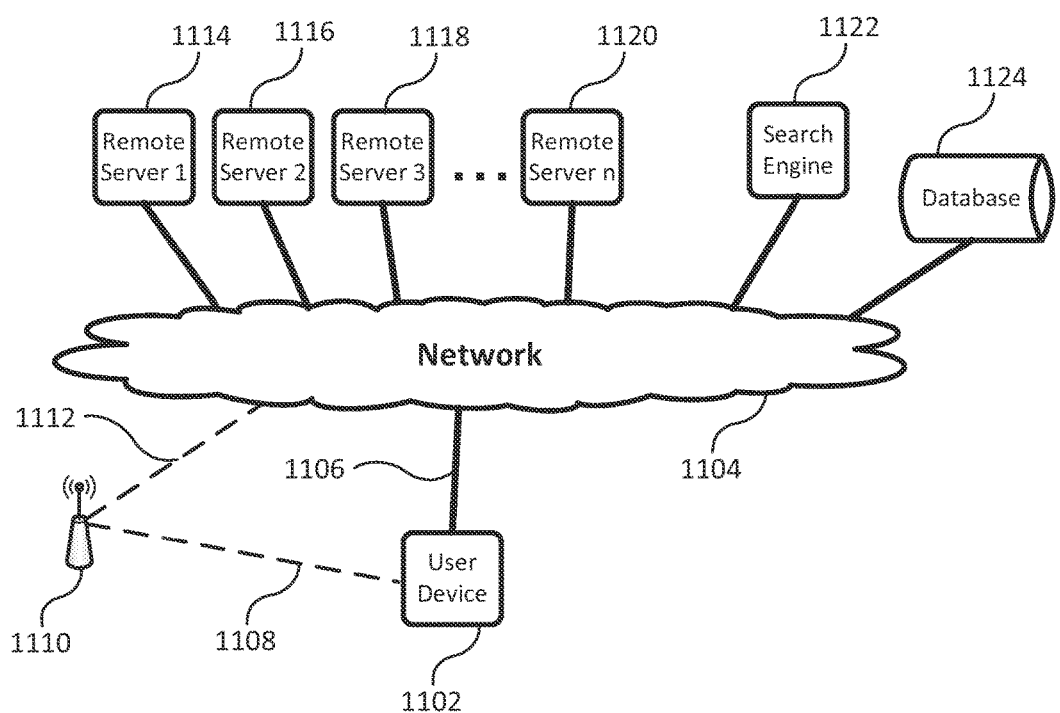
FIG. 11 shows an illustrative system in accordance with some implementations of the present disclosure.
Figure 12:
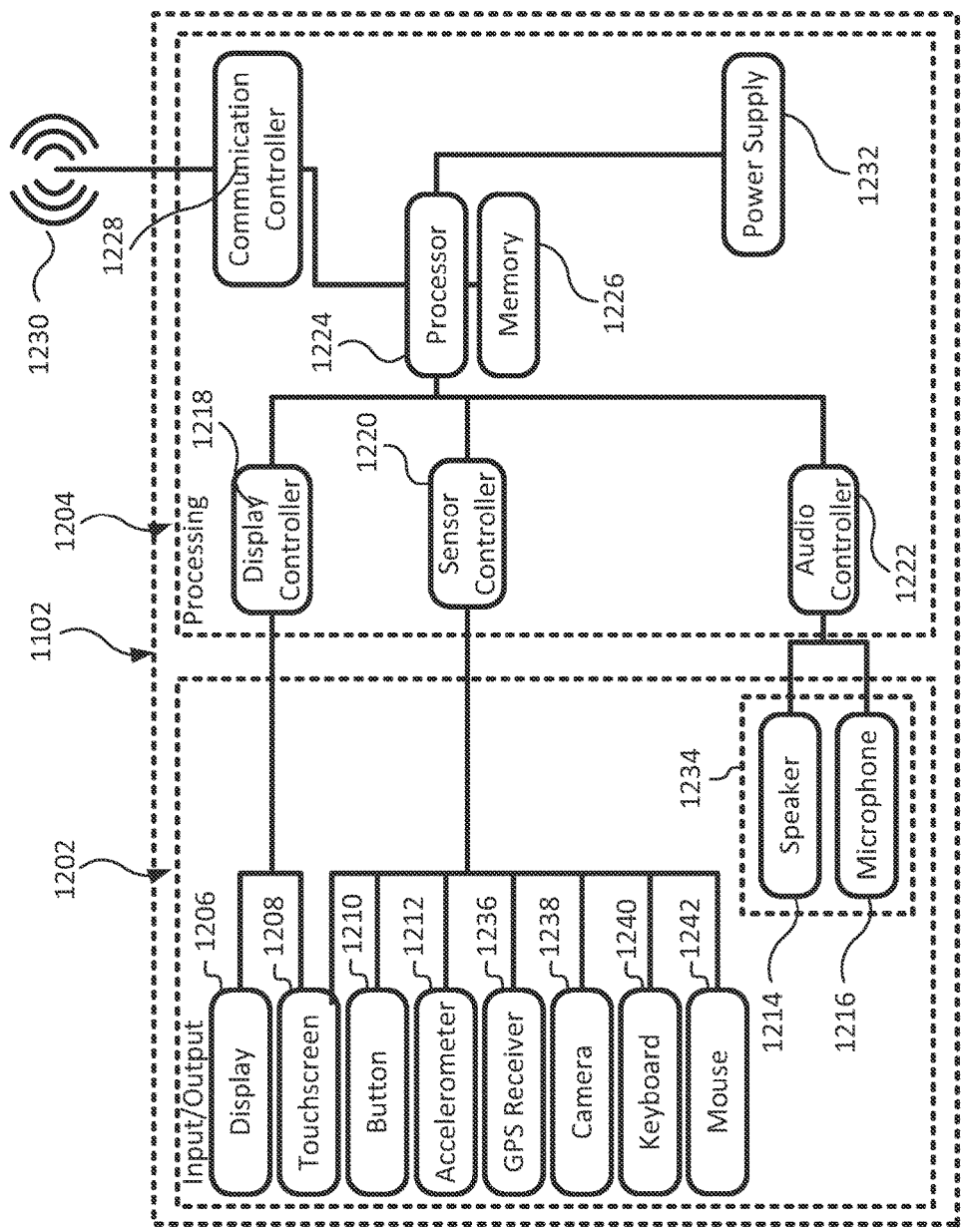
FIG. 12 is a block diagram of an illustrative computer system in accordance with some implementations of the present disclosure.

The following description and accompanying FIGS. 11 and 12 describe illustrative computer systems that may be used in some implementations of the present disclosure. It will be understood that elements of FIGS. 11 and 12 are merely exemplary and that any suitable elements may be added, removed, duplicated, replaced, or otherwise modified.

It will be understood that the system may be implemented on any suitable computer or combination of computers. In some implementations, the system is implemented in a distributed computer system including two or more computers. In an example, the system may use a cluster of computers located in one or more locations to perform processing and storage associated with the system. It will be understood that distributed computing may include any suitable parallel computing, distributed computing, network hardware, network software, centralized control, decentralized control, any other suitable implementations, or any combination thereof.

FIG. 11 shows illustrative computer system 1100 in accordance with some implementations of the present disclosure. System 1100 may include one or more computing device 1102. In some implementations, computing device 1102, and any other device of system 1100, includes one or more computers and/or one or more processors. In some implementations, a processor includes one or more hardware processors, for example, integrated circuits, one or more software modules, computer-readable media such as memory, firmware, or any combination thereof. In some implementations, computing device 1102 includes one or more computer-readable medium storing software, include instructions for execution by the one or more processors for performing the techniques discussed above with respect to FIGS. 7 and 8, or any other techniques disclosed herein. In some implementations, computing device 1102 includes a smartphone, tablet computer, desktop computer, laptop computer, server, personal digital assistant (PDA), portable audio player, portable video player, mobile gaming device, other suitable user device capable of providing content, or any combination thereof.

Computing device 1102 may be coupled to network 1104 directly through connection 1006, through wireless repeater 1110, by any other suitable way of coupling to network 1104, or by any combination thereof. Network 1104 may include the Internet, a dispersed network of computers and servers, a local network, a public intranet, a private intranet, other coupled computing systems, or any combination thereof.

Computing device 1102 may be coupled to network 1104 by wired connection 1106. Connection 1106 may include Ethernet hardware, coaxial cable hardware, DSL hardware, T-1 hardware, fiber optic hardware, analog phone line hardware, any other suitable wired hardware capable of communicating, or any combination thereof. Connection 1106 may include transmission techniques including TCP/IP transmission techniques, IEEE 1112 transmission techniques, Ethernet transmission techniques, DSL transmission techniques, fiber optic transmission techniques, ITU-T transmission techniques, any other suitable transmission techniques, or any combination thereof.

Computing device 1102 may be wirelessly coupled to network 1104 by wireless connection 1108. In some implementations, wireless repeater 1110 receives transmitted information from computing device 1102 by wireless connection 1108 and communicates it with network 1104 by connection 1112. Wireless repeater 1110 receives information from network 1104 by connection 1012 and communicates it with computing device 1102 by wireless connection 1108. In some implementations, wireless connection 1108 may include cellular phone transmission techniques, code division multiple access (CDMA) transmission techniques, global system for mobile communications (GSM) transmission techniques, general packet radio service (GPRS) transmission techniques, satellite transmission techniques, infrared transmission techniques, Bluetooth transmission techniques, Wi-Fi transmission techniques. WiMax transmission techniques, any other suitable transmission techniques, or any combination thereof.

Connection 1112 may include Ethernet hardware, coaxial cable hardware, DSL hardware, T-1 hardware, fiber optic hardware, analog phone line hardware, wireless hardware, any other suitable hardware capable of communicating, or any combination thereof. Connection 1012 may include wired transmission techniques including TCP/IP transmission techniques, IEEE 1112 transmission techniques, Ethernet transmission techniques, DSL transmission techniques, fiber optic transmission techniques, ITU-T transmission techniques, any other suitable transmission techniques, or any combination thereof. Connection 1012 may include may include wireless transmission techniques including cellular phone transmission techniques, code division multiple access (CDMA) transmission techniques, global system for mobile communications (GSM) transmission techniques, general packet radio service (GPRS) transmission techniques, satellite transmission techniques, infrared transmission techniques, Bluetooth transmission techniques, Wi-Fi transmission techniques, WiMax transmission techniques, any other suitable transmission techniques, or any combination thereof.

Wireless repeater 1110 may include any number of cellular phone transceivers, network routers, network switches, communication satellites, other devices for communicating information from computing device 1102 to network 1104, or any combination thereof. It will be understood that the arrangement of connection 1106, wireless connection 1108 and connection 1112 is merely illustrative and that system 1100 may include any suitable number of any suitable devices coupling computing device 1102 to network 1104. It will also be understood that any computing device 1102, may be communicatively coupled with any user device, remote server, local server, any other suitable processing equipment, or any combination thereof, and may be coupled using any suitable technique as described above.

In some implementations, any suitable number of remote servers 1114, 1116, 1118, 1120, may be coupled to network 1104. Remote servers may be general purpose, specific, or any combination thereof. One or more search engine servers 1122 may be coupled to the network 1104. In some implementations, search engine server 1122 may include the knowledge graph, may include processing equipment configured to access the knowledge graph, may include processing equipment configured to receive search queries related to the knowledge graph, may include any other suitable information or equipment, or any combination thereof. One or more database servers 1124 may be coupled to network 1104. In some implementations, database server 1124 may store the knowledge graph. In some implementations, where there is more than one knowledge graph, the more than one may be included in database server 1124, may be distributed across any suitable number of database servers and general purpose servers by any suitable technique, or any combination thereof. It will also be understood that the system may use any suitable number of general purpose, specific purpose, storage, processing, search, any other suitable server, or any combination.

FIG. 12 is includes a block diagram of illustrative computing device 1200 in accordance with some implementations of the present disclosure. FIG. 11 includes computing device 1200. In some implementations, computing device 1200 corresponds to computing device 1102 of FIG. 11, a remote computer illustrated in system 1100 of FIG. 11, any other suitable computer corresponding to system 1100 of FIG. 11, any other suitable device, or any combination thereof. In some implementations, computing device 1210 is an illustrative local and/or remote computer that is part of a distributed computing system. Computing device 1210 may include input/output equipment 1212 and processing equipment 1204. Input/output equipment 1212 may include display 1206, touchscreen 1208, button 1210, accelerometer 1212, global positions system (GPS) receiver 1236, camera 1238, keyboard 1040, mouse 1042, and audio equipment 1234 including speaker 1214 and microphone 1216. In some implementations, the equipment of computing device 1200 may be representative of equipment included in a smartphone user device. It will be understood that the specific equipment included in the illustrative computer system may depend on the type of user device. For example, the input/output equipment 1212 of a desktop computer may include a keyboard 1040 and mouse 1042 and may omit accelerometer 1212 and GPS receiver 1236. It will be understood that computing device 1200 may omit any suitable illustrated elements, and may include equipment not shown such as media drives, data storage, communication devices, display devices, processing equipment, any other suitable equipment, or any combination thereof.

In some implementations, display 1206 may include a liquid crystal display, light emitting diode display, organic light emitting diode display, amorphous organic light emitting diode display, plasma display, cathode ray tube display, projector display, any other suitable type of display capable of displaying content, or any combination thereof. Display 1206 may be controlled by display controller 1218 or by processor 1224 in processing equipment 1204, by processing equipment internal to display 1206, by other controlling equipment, or by any combination thereof. In some implementations, display 1206 may display data from a knowledge graph.

Touchscreen 1208 may include a sensor capable of sensing pressure input, capacitance input, resistance input, piezoelectric input, optical input, acoustic input, any other suitable input, or any combination thereof. Touchscreen 1208 may be capable of receiving touch-based gestures. Received gestures may include information relating to one or more locations on the surface of touchscreen 1208, pressure of the gesture, speed of the gesture, duration of the gesture, direction of paths traced on its surface by the gesture, motion of the device in relation to the gesture, other suitable information regarding a gesture, or any combination thereof. In some implementations, touchscreen 1208 may be optically transparent and located above or below display 1206. Touchscreen 1208 may be coupled to and controlled by display controller 1218, sensor controller 1220, processor 1224, any other suitable controller, or any combination thereof. In some implementations, touchscreen 1208 may include a virtual keyboard capable of receiving, for example, a search query used to identify data in a knowledge graph.

In some embodiments, a gesture received by touchscreen 1208 may cause a corresponding display element to be displayed substantially concurrently (i.e., immediately following or with a short delay) by display 1206. For example, when the gesture is a movement of a finger or stylus along the surface of touchscreen 1208, the system may cause a visible line of any suitable thickness, color, or pattern indicating the path of the gesture to be displayed on display 1206. In some implementations, for example, a desktop computer using a mouse, the functions of the touchscreen may be fully or partially replaced using a mouse pointer displayed on the display screen.

Button 1210 may be one or more electromechanical push-button mechanism, slide mechanism, switch mechanism, rocker mechanism, toggle mechanism, other suitable mechanism, or any combination thereof. Button 1210 may be included in touchscreen 1208 as a predefined region of the touchscreen (e.g., soft keys). Button 1210 may be included in touchscreen 1208 as a region of the touchscreen defined by the system and indicated by display 1206. Activation of button 1210 may send a signal to sensor controller 1220, processor 1224, display controller 1220, any other suitable processing equipment, or any combination thereof. Activation of button 1210 may include receiving from the user a pushing gesture, sliding gesture, touching gesture, pressing gesture, time-based gesture (e.g., based on the duration of a push), any other suitable gesture, or any combination thereof.

Accelerometer 1212 may be capable of receiving information about the motion characteristics, acceleration characteristics, orientation characteristics, inclination characteristics and other suitable characteristics, or any combination thereof, of computing device 1200. Accelerometer 1212 may be a mechanical device, microelectromechanical (MEMS) device, nanoelectromechanical (NEMS) device, solid state device, any other suitable sensing device, or any combination thereof. In some implementations, accelerometer 1212 may be a 3-axis piezoelectric microelectromechanical integrated circuit which is configured to sense acceleration, orientation, or other suitable characteristics by sensing a change in the capacitance of an internal structure. Accelerometer 1212 may be coupled to touchscreen 1208 such that information received by accelerometer 1212 with respect to a gesture is used at least in part by processing equipment 1204 to interpret the gesture.

Global positioning system (GPS) receiver 1236 may be capable of receiving signals from global positioning satellites. In some implementations, GPS receiver 1236 may receive information from one or more satellites orbiting the earth, the information including time, orbit, and other information related to the satellite. This information may be used to calculate the location of computing device 1200 on the surface of the earth. GPS receiver 1236 may include a barometer (not shown) to improve the accuracy of the location. GPS receiver 1236 may receive information from other wired and wireless communication sources regarding the location of computing device 1200. For example, the identity and location of nearby cellular phone towers may be used in place of, or in addition to, GPS data to determine the location of computing device 1200.

Camera 1238 may include one or more sensors to detect light. In some implementations, camera 1238 may receive video images, still images, or both. Camera 1238 may include a charged coupled device (CCD) sensor, a complementary metal oxide semiconductor (CMOS) sensor, a photocell sensor, an IR sensor, any other suitable sensor, or any combination thereof. In some implementations, camera 1238 may include a device capable of generating light to illuminate a subject, for example, an LED light. Camera 1238 may communicate information captured by the one or more sensor to sensor controller 1220, to processor 1224, to any other suitable equipment, or any combination thereof. Camera 1238 may include lenses, filters, and other suitable optical equipment. It will be understood that computing device 1200 may include any suitable number of camera 1238.

Audio equipment 1234 may include sensors and processing equipment for receiving and transmitting information using acoustic or pressure waves. Speaker 1214 may include equipment to produce acoustic waves in response to a signal. In some implementations, speaker 1214 may include an electroacoustic transducer wherein an electromagnet is coupled to a diaphragm to produce acoustic waves in response to an electrical signal. Microphone 1216 may include electroacoustic equipment to convert acoustic signals into electrical signals. In some implementations, a condenser-type microphone may use a diaphragm as a portion of a capacitor such that acoustic waves induce a capacitance change in the device, which may be used as an input signal by computing device 1200.

Speaker 1214 and microphone 1216 may be contained within computing device 1200, may be remote devices coupled to computing device 1200 by any suitable wired or wireless connection, or any combination thereof.

Speaker 1214 and microphone 1216 of audio equipment 1234 may be coupled to audio controller 1222 in processing equipment 1204. This controller may send and receive signals from audio equipment 1234 and perform pre-processing and filtering steps before transmitting signals related to the input signals to processor 1224. Speaker 1214 and microphone 1216 may be coupled directly to processor 1224. Connections from audio equipment 1234 to processing equipment 1204 may be wired, wireless, other suitable arrangements for communicating information, or any combination thereof.

Processing equipment 1204 of computing device 1200 may include display controller 1218, sensor controller 1220, audio controller 1222, processor 1224, memory 1226, communication controller 1228, and power supply 1232.

Processor 1224 may include circuitry to interpret signals input to computing device 1200 from, for example, touchscreen 1208 and microphone 1216. Processor 1224 may include circuitry to control the output to display 1206 and speaker 1214. Processor 1224 may include circuitry to carry out instructions of a computer program. In some implementations, processor 1224 may be an integrated electronic circuit based, capable of carrying out the instructions of a computer program and include a plurality of inputs and outputs.

Processor 1224 may be coupled to memory 1226. Memory 1226 may include random access memory (RAM), flash memory, programmable read only memory (PROM), erasable programmable read only memory (EPROM), magnetic hard disk drives, magnetic tape cassettes, magnetic floppy disks optical CD-ROM discs, CD-R discs, CD-RW discs, DVD discs, DVD+R discs, DVD-R discs, any other suitable storage medium, or any combination thereof.

The functions of display controller 1218, sensor controller 1220, and audio controller 1222, as have been described above, may be fully or partially implemented as discrete components in computing device 1200, fully or partially integrated into processor 1224, combined in part or in full into combined control units, or any combination thereof.

Communication controller 1228 may be coupled to processor 1224 of computing device 1200. In some implementations, communication controller 1228 may communicate radio frequency signals using antenna 1230. In some implementations, communication controller 1228 may communicate signals using a wired connection, not shown. Wired and wireless communications communicated by communication controller 1228 may use Ethernet, amplitude modulation, frequency modulation, bitstream, code division multiple access (CDMA), global system for mobile communications (GSM), general packet radio service (GPRS), satellite, infrared, Bluetooth, Wi-Fi, WiMax, any other suitable communication configuration, or any combination thereof. The functions of communication controller 1228 may be fully or partially implemented as a discrete component in computing device 1200, may be fully or partially included in processor 1224, or any combination thereof. In some implementations, communication controller 1228 may communicate with a network such as network 1004 of FIG. 10 and may receive information from a knowledge graph stored, for example, in database 1024 of FIG. 10.

Power supply 1232 may be coupled to processor 1224 and to other components of computing device 1200. Power supply 1232 may include a lithium-polymer battery, lithium-ion battery, NiMH battery, alkaline battery, lead-acid battery, fuel cell, solar panel, thermoelectric generator, any other suitable power source, or any combination thereof. Power supply 1232 may include a hard wired connection to an electrical power source, and may include electrical equipment to convert the voltage, frequency, and phase of the electrical power source input to suitable power for computing device 1200. In some implementations of power supply 1232, a wall outlet may provide 1020 volts, 60 Hz AC. A circuit of transformers, resistors, inductors, capacitors, transistors, and other suitable electronic components included in power supply 1232 may convert the 1020V AC from a wall outlet power to 5 volts DC. In some implementations of power supply 1232, a lithium-ion battery including a lithium metal oxide-based cathode and graphite-based anode may supply 3.7V to the components of computing device 1200. Power supply 1232 may be fully or partially integrated into computing device 1200, or may function as a stand-alone device. Power supply 1232 may power computing device 1200 directly, may power computing device 1200 by charging a battery, may provide power by any other suitable way, or any combination thereof.

The foregoing is merely illustrative of the principles of this disclosure and various modifications may be made by those skilled in the art without departing from the scope of this disclosure. The above described implementations are presented for purposes of illustration and not of limitation. The present disclosure also may take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A computer-implemented method comprising the following operations performed by at least one processor:
   receiving a first search query associated with an entity reference, wherein the entity reference corresponds to one or more distinct entities;
   providing a set of results for the first search query, wherein the set of results distinguishes between the one or more distinct entities;
   identifying one or more attributes of at least one entity of the one or more distinct entities based at least in part on the set of results;
   in response to the first search query, automatically generating a selectable list of one or more additional search queries that are based on but separate from the first search query, wherein the one or more additional search queries comprise combinations of the at least one entity and the one or more attributes;
   providing the selectable list of the one or more additional search queries for display within a user interface;

receiving an input selecting at least one of the one or more additional search queries that are displayed within the user interface; and providing an updated set of results based on the selected one or more additional search queries, wherein the updated set of results comprises at least one result not in the set of results.

2. A system comprising:

one or more storage devices that store instructions; and one or more computers configured by executing the instructions to perform operations comprising:

receiving a first search query associated with an entity reference, wherein the entity reference corresponds to one or more distinct entities;

providing a set of results for the first search query, wherein the set of results distinguishes between distinct entities;

identifying one or more attributes of at least one entity of the one or more distinct entities based at least in part on the set of results;

in response to the first search query, automatically generating a selectable list of one or more additional search queries that are based on but separate from the first search query, wherein the one or more additional search queries comprise combinations of the at least one entity and the one or more attributes;

providing the selectable list of the one or more additional search queries for display within a user interface;

receiving an input selecting at least one of the one or more additional search queries that are displayed within the user interface; and providing an updated set of results based on the selected one or more additional search queries, wherein the updated set of results comprises at least one result not in the set of results.

3. A computer-readable medium storing instructions that, when executed by one or more processors, cause the one or more processors to perform operations comprising:

receiving a first search query associated with an entity reference, wherein the entity reference corresponds to one or more distinct entities;

providing a set of results for the first search query, wherein the set of results distinguishes between the one or more distinct entities;

identifying one or more attributes of at least one entity of the one or more distinct entities based at least in part on the set of results;

in response to the first search query, automatically generating a selectable list of one or more additional search queries separate from the first search query, wherein the one or more additional search queries comprise combinations of the at least one entity and the one or more attributes;

providing the selectable list of the one or more additional search queries for display within a user interface receiving an input selecting at least one of the one or more additional search queries that are displayed within the user interface; and providing an updated set of results based on the selected one or more additional search queries, wherein the updated set of results comprises at least one result not in the set of results.

4. The method of claim 1, wherein automatically generating the selectable list of the one or more additional search queries comprises:

ranking the identified one or more attributes; and automatically generating the selectable list of the one or more additional search queries based on the first search query, the at least one entity, the one or more attributes, and the ranking.

5. The method of claim 1, wherein the one or more distinct entities comprise a plurality of distinct entities, and wherein the method further comprises, prior to automatically generating the selectable list of the one or more additional search queries:

providing the plurality of distinct entities for display within the user interface; and receiving a selection of at least a first entity of the plurality of distinct entities;

wherein identifying the one or more attributes of the at least one entity comprises identifying one or more attributes of the selected first entity; and wherein automatically generating the selectable list of the one or more additional search queries comprises automatically generating the selectable list of the one or more additional search queries that comprise combinations of the selected first entity and the one or more attributes of the selected first entity.

6. The method of claim 1, wherein identifying one or more attributes comprises identifying one or more attributes from a structured data source.

7. The method of claim 1, wherein identifying one or more attributes comprises identifying one or more attributes from unstructured data.

8. The method of claim 1, wherein the updated set of results based on the selected one or more additional search queries comprises at least one result from the set of results for the first search query.

9. The method of claim 1, wherein:

the first search query comprises a first textual search query that comprises a first set of words; and the one or more additional search queries comprise one or more additional textual search queries, wherein each of the one or more additional textual search queries comprises at least one additional word not included in the first set of words.

10. The system of claim 2, wherein the one or more computers are further configured to perform operations comprising:

ranking the identified one or more attributes;

wherein automatically generating the selectable list comprises automatically generating the one or more additional search queries based on the first search query, the at least one entity, the one or more attributes, and the ranking.

11. The system of claim 2, wherein the ranking is based on frequency of occurrence.

12. The system of claim 2, wherein the ranking is based on a location of each of the one or more attributes with respect to the entity reference in the set of results.

13. The system of claim 2, wherein the one or more distinct entities comprise a plurality of distinct entities, and wherein the one or more computers are further configured to perform operations comprising, prior to automatically generating the selectable list of the one or more additional search queries:

providing the plurality of distinct entities for display within the user interface; and receiving a selection of at least a first entity of the plurality of distinct entities;

wherein identifying the one or more attributes of the at least one entity comprises identifying one or more attributes of the selected first entity; and wherein automatically generating the selectable list of the one or more additional search queries comprises automatically generating the selectable list of the one or more additional search queries that comprise combinations of the selected first entity and the one or more attributes of the selected first entity.

14. The system of claim 2, wherein the one or more computers are further configured to perform operations comprising identifying one or more attributes from a structured data source.

15. The system of claim 2, wherein the one or more computers are further configured to perform operations comprising identifying one or more attributes from unstructured data.

16. The computer-readable medium of claim 3, wherein automatically generating the selectable list of the one or more additional search queries comprises:

ranking the identified one or more attributes; and automatically generating the selectable list of the one or more additional search queries based on the first search query, the at least one entity, the one or more attributes, and the ranking.

17. The computer-readable medium of claim 3, wherein identifying one or more attributes comprises identifying one or more attributes from a structured data source.

18. The computer-readable medium of claim 3, wherein identifying one or more attributes comprises identifying one or more attributes from unstructured data.

19. The method of claim 4, wherein the ranking is based on frequency of occurrence.

20. The method of claim 4, wherein the ranking is based on a location of each of the one or more attributes with respect to the entity reference in the set of results.

21. The method of claim 5, wherein the plurality of distinct entities comprise a plurality of human persons.

22. The method of claim 6, wherein the structured data source is a social graph.

23. The system of claim 14, wherein the structured data source is a social graph.

24. The system of claim 14, wherein the structured data source is a knowledge graph.

25. The computer-readable medium of claim 16, wherein the ranking is based on frequency of occurrence.

26. The computer-readable medium of claim 16, wherein the ranking is based on a location of each of the one or more attributes with respect to the entity reference in the set of results.

27. The computer-readable medium of claim 17, wherein the structured data source is a social graph.

28. The computer-readable medium of claim 17, wherein the structured data source is a knowledge graph.

* * * * *